United States Patent
Felt et al.

(10) Patent No.: US 11,741,184 B2
(45) Date of Patent: *Aug. 29, 2023

(54) SYSTEMS FOR LAUNCHING CONTENT FOR PUBLICATION

(71) Applicant: Contentful GmbH, Berlin (DE)

(72) Inventors: Bruce Felt, Berlin (DE); Benjamin Keyser, Berlin (DE); Paolo Negri, Berlin (DE); Stephan Schneider, Berlin (DE); Thomas Spiesser, Berlin (DE)

(73) Assignee: Contentful GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,767

(22) Filed: Aug. 15, 2022

(65) Prior Publication Data
US 2022/0391458 A1    Dec. 8, 2022

Related U.S. Application Data

(63) Continuation of application No. 17/471,152, filed on Sep. 9, 2021, now Pat. No. 11,436,300, which is a
(Continued)

(51) Int. Cl.
*G06F 16/958* (2019.01)
*H04L 67/55* (2022.01)
(Continued)

(52) U.S. Cl.
CPC .......... *G06F 16/958* (2019.01); *G06F 16/176* (2019.01); *G06F 16/93* (2019.01); *H04L 67/02* (2013.01); *H04L 67/55* (2022.05)

(58) Field of Classification Search
CPC ......... H04L 67/10; H04L 67/02; H04L 63/08; H04L 63/102; H04L 63/10;
(Continued)

(56) References Cited

U.S. PATENT DOCUMENTS

| 2009/0125413 A1 | 5/2009 | Le Chevalier et al. |
| 2013/0019028 A1 | 1/2013 | Myers et al. |

(Continued)

FOREIGN PATENT DOCUMENTS

WO    20090049053 A1    4/2009

OTHER PUBLICATIONS

PCTIB2022052340_PCT/ISA/220 Transmittal of Search Report and Written Opinion, dated Jun. 28, 2022.

*Primary Examiner* — Djenane M Bayard
(74) *Attorney, Agent, or Firm* — Penilla IP, APC

(57) ABSTRACT

A process for rendering a user interface for launching content for publication using a content management system (CMS), includes: providing, over a network, an editor application enabling editing of entities stored in the CMS; providing, over the network, a launch application, wherein execution of the launch application renders the user interface for launching content for publication, wherein the user interface includes a reference tree providing a hierarchical visualization of reference relationships amongst the entities; receiving selection of a group of entities for publishing; and generating, responsive to the selection, an application programming interface (API) call to the CMS to trigger initiation of a validation process to validate each entity, without requiring separate API calls for validating each entity; and, wherein the validation process, once initiated, proceeds automatically without requiring said separate API calls to separately initiate publication of each of the entities in the group of entities.

20 Claims, 37 Drawing Sheets

Related U.S. Application Data continuation of application No. 17/202,142, filed on Mar. 15, 2021, now Pat. No. 11,409,835, said application No. 17/471,152 is a continuation of application No. 17/201,854, filed on Mar. 15, 2021, now Pat. No. 11,210,364.

(51) Int. Cl.
*H04L 67/02* (2022.01)
*G06F 16/93* (2019.01)
*G06F 16/176* (2019.01)

(58) Field of Classification Search
CPC . H04L 63/0807; H04L 63/0815; H04L 63/20; H04L 67/34; H04L 63/0853; H04L 63/205; H04L 63/0861; H04L 67/306; H04L 2209/38; H04L 9/3239; H04L 67/22; H04L 67/42; H04L 63/0823; H04L 65/403; H04L 67/20; H04L 63/168; H04L 2209/56; H04L 63/083; H04L 63/1441; H04L 67/125; H04L 63/0281; H04L 63/1425; H04L 67/16; H04L 67/141; H04L 67/025; H04L 63/062; H04L 67/28; H04L 9/0637; H04L 9/32; H04L 63/0884; H04L 63/1483; H04L 67/12; H04L 67/2842; H04L 2463/121; H04L 61/1511; H04L 63/0435; H04L 63/0442; H04L 63/105; H04L 63/1416; H04L 67/1095; H04L 41/22; H04L 41/12; H04L 43/045; H04L 67/32; H04L 63/12; H04L 41/509; H04L 67/18; H04L 41/5009; H04L 63/0428; H04L 12/66; H04L 2209/20; H04L 2209/24; H04L 2209/26; H04L 63/123; H04L 67/1097; H04L 67/40; H04L 9/321; H04L 9/3265; H04L 9/50; H04L 63/0227; H04L 67/535; H04L 63/029; H04L 67/55; H04L 63/0245; H04L 63/101; H04L 63/1433; H04L 9/14; H04L 41/0893; H04L 43/16; H04L 9/3213; H04L 9/3231; H04L 12/2803; H04L 12/2807; H04L 12/2818; H04L 12/282; H04L 12/2825; H04L 12/2827; H04L 12/2832; H04L 2012/285; H04L 47/10; H04L 47/20; H04L 47/2483; H04L 63/104; H04L 63/145; H04L 67/104; H04L 69/26; H04L 41/0866; H04L 41/0869; H04L 41/0894
See application file for complete search history.

(56) References Cited

U.S. PATENT DOCUMENTS

| | | |
|---|---|---|
| 2015/0248484 A1 | 9/2015 | Yu et al. |
| 2016/0188553 A1 | 6/2016 | Myers et al. |
| 2017/0339229 A1 | 11/2017 | Miller et al. |
| 2019/0087393 A1 | 3/2019 | Myers et al. |
| 2020/0126148 A1* | 4/2020 | Kadlabalu ............ G06F 16/164 |
| 2021/0377363 A1* | 12/2021 | Garaga ................ G06F 9/4401 |

* cited by examiner

| Workflows 700 | | 702 704 706 708 710 712 714 ⚙ Configure | | | | |
|---|---|---|---|---|---|---|
| ☐ All | 7 | Name | Content type | Updated | Author | Status |
| ☐ First Draft | 0 | SDK basics 2 | lesson | Wed Feb 17 2021 | Khaled Doe | DRAFT |
| ☐ Review | 3 | Fetch all entries yo | lesson | Wed Feb 17 2021 | Khaled Doe | DRAFT |
| ☐ Ready | 0 | Other Homepage | layout | Wed Feb 17 2021 | Team Pulitzer | PUBLISHED |
| ☐ In Production | 0 | Hello Contentful | course | Sun Feb 14 2021 | Khaled Doe | CHANGED |
| ☐ In Progress | 3 | Einstiegskurs | category | Wed Feb 10 2021 | Khaled Doe | CHANGED |
| ☐ In Review | 0 | Application development | category | | | |
| ☐ Approved | 0 | test-title-132 | category | Tue Feb 02 2021 | John Smith | PUBLISHED |
| ☐ Update Required | 1 | | | | | |
| ☐ In progress | 0 | | | | | |
| ☐ Published | 0 | | | | | |
| ☐ Edited | 0 | | | | | |
| ☐ Inactive | 0 | | | | | |

Fig. 7A

Configure workflow

Create workflows with custom states for your content.

- First Draft
- Review
- Ready
- In Production

Entry is created

720

722 (+)

Content Types (required)
Assign the workflow to content types.

☑ Course
☐ Category
☐ Component: Image
☐ Metadata: SEO
☑ Landing Page
☐ Compose: Page

724

Save

View documentation

Fig. 7B

Team Pulitzer ≡ ⌂ Space home 🔷 Content model 🖋 Content 🖼 Media 🏠 Apps ▽ ⚙ Settings ▽ 🔍 ❓ (BF) ▽ ⋮

📝 Page
Article: Berlin: One perfect day

📝 Editor  ⇌ References

| Changed
| Draft
| ■ Published

☐ ⇌ Article: MadC — PUBLISHED — 810
☐ Article: Manfred Kielnhofer — DRAFT
☐ Manfred Kielnhofer — DRAFT
☐ 🖼 Manfred Kielnhofer — DRAFT
☐ ■ Marga Snyder (editorial #1) — PUBLISHED
☐ Related article: Artist biographies: Manfred Kielnhofer — DRAFT
☐ ■ ⇌ Article: Blek le (Xavier Prou) — PUBLISHED
☐ ■ ⇌ Article: MadC — PUBLISHED — 812
☐ Article: Florentijin Hofman — DRAFT
+ more 814 points to first item; 802 arrow;

REFERENCES

Apply actions to all selected references
Article: Berlin: One perfect day and 13 unique reference are selected.

[ Publish selected ]

[ Validate selected ]

[ Add to a release ]

ⓘ The reference view is a new feature that gathers every linked entry and asset for a particular entry in a single view allowing you to apply mass actions.
Find out more

| Team Pulitzer Colorful Coin ≡ | ⌂ Space home | ◆ Content model | ▣ Content | ◲ Media | ⌂ Apps ▾ | ⚙ Settings ▾ | | ⚲ | ? | BF ▾ | ⋮ |

Topic-Article
Keith Haring

✎ Editor  ⊡ References | General  Comments  Info

Title (required)  ← 840

Keith Haring 12 characters     Maximum 256 characters

Short description (required)  ← 842

Keith Allen Haring was an American artist whose pop art and graffiti-like work grew out of the New York City street culture of the 1980s.

Published data (required)

Monday, September 10th 2018  ☐  00:00  Clear

Featured image (required)

[ Image ]  [DRAFT] ⋯

STATUS

Current [ Publish   ⌄ ]  [DRAFT]

Last saved Aug 25, 2020

RELEASES

+Add to release

[NEW] Plan and schedule releases in the new Contentful Launch. >

TASKS

No tasks have been defined yet.

+ Create new task

Fig. 8E

| Release
Black Friday ⌄ | | | | Schedule ⌄ |
|---|---|---|---|---|
| Content | | | | + Add Content ⌄  ⋯ |
| Filter by | ☐ Title | Content Type | Last Updated | Status | Workflow |
| 🗎 CONTENT | PREVIEWBLE CONTENT | | | | |
| All entries 2 | ☐ Serve localized content (2) | Lesson | 17 Feb 2021 | DRAFT | No State |
| Lesson 1 | OTHER CONTENT | | | | |
| Lesson > Copy 1 | ☐ Content Management > copy | Lesson > Copy | 17 Feb 2021 | DRAFT | No State |
| 🖼 MEDIA | | | | | |
| All assets 0 | | | | | |
| ⇅ WORKFLOWS ⋮ | | | | | |
| ☐ First Draft 0 | | | | | |
| ☐ Review 0 | | | | | |
| ☐ Ready 0 | | | | | |
| ☐ In Production 0 | | | | | |

↗ 930

⊘ Content has been successfully added to Release  ✕

Release
Black Friday ⌄

Schedule ⌄

Content | + Add Content ⌄ ⋯

Filter by

☰ CONTENT
All entries 2
Lesson 1
Lesson > Copy 1

🖼 MEDIA
All assets 0

⇅ WORKFLOWS ⋯
☐ First Draft 0
☐ Review 0
☐ Ready 0
☐ In Production 0

| ☐ Title | Content Type | Last Updated | Status | Workflow |
|---|---|---|---|---|
| PREVIEWBLE CONTENT | | | | |
| ▨ Serve localized content (2) | Lesson | 17 Feb 2021 | DRAFT | No State — 952 |
| OTHER CONTENT | | | | |
| ☐ Content Management > copy | Lesson > Copy | 17 Feb 2021 | DRAFT | No State — 954 |

— 950

✕

Lesson
Serve localized content (2)

[ Edit Selected Entry ]

Platform: The Node.js example app    Change

[ Preview ]   ⟵ 956

[ Remove from release ]   ⟵ 958

☐ No State  ⌄
   Select a state to start workflow

☐ In Progress
   In Progress
☐ In Review
☐ Approved
☐ Updated Required
   Updated Required View workflows dashboard

| Release | | | | | Schedule ⌄ |
|---|---|---|---|---|---|
| ⌄ Black Friday | | | | | |

| Content | | | | 950 | + Add Content ⌄  ⋯  ✕ |
|---|---|---|---|---|---|
| Filter by | ☐ Title | Content Type | Last Updated | Status | Workflow |
| ☰ CONTENT | PREVIEWBLE CONTENT | | | | Lesson |
| All entries  2 | ☑ Serve localized content (2) | Lesson | 17 Feb 2021 | DRAFT | ■ In Progress  960 |
| Lesson  1 | | | | | Serve localized content (2) |
| Lesson > Copy  1 | OTHER CONTENT | | | | Edit Selected Entry |
| ⊞ MEDIA | ☐ Content Management > copy | Lesson > Copy | 17 Feb 2021 | DRAFT | No State |
| All assets  0 | | | | | Platform: The Node.js example app  Change |
| ⇅ WORKFLOWS  ⋯ | | | | | Preview |
| ☐ First Draft  0 | | | | | |
| ☐ Review  0 | | | | | Remove from release |
| ☐ Ready  0 | | | | | |
| ☐ In Production  0 | | | | | ■ In Progress  ⌄ |
| | | | | | In Progress |

Fig. 9H

| Release | | | | | | Schedule ∨ |
|---|---|---|---|---|---|---|
| ∨ Black Friday | | | | | | Publish Release |
| | | | | | | Unpublish Release |
| Content | | | | | +Ad | Validate Release |
| | | | | | 970 | |
| Filter by | Title | Content Type | Last Updated | Status | Workflow | |
| ≡ CONTENT | PREVIEWBLE CONTENT | | | | | |
| All entries 2 | ☒ Serve localized content (2) | Lesson | 17 Feb 2021 | DRAFT | ■ Approved | |
| Lesson 1 | | | | | | |
| Lesson > Copy 1 | OTHER CONTENT | | | | | |
| ⌸ MEDIA | ☐ Content Management Lesson > Copy > copy | | 17 Feb 2021 | DRAFT | No State | |
| All assets 0 | | | | | | |
| | | | | | Lesson | |
| ⇵ WORKFLOWS ⋮ | | | | | Serve localized content (2) | |
| ☐ First Draft 0 | | | | | Edit Selected Entry Change | |
| ☐ Review 0 | | | | | Platform: The Node.js example app | |
| ☐ Ready 0 | | | | | Preview | |
| ☐ In Production 0 | | | | | Remove from release | |
| | | | | | ☒ Approved ∨ | |

Fig. 9I

Release
Black Friday

[PUBLISHED] Today, 17 Feb 2021 at 8:00 PM    Schedule ›

Cancel schedule    Add Content ⌄  •••

Created today by Me    ✕

Content

| Filter by | Title | Content Type | Last Updated | Status | Workflow |
|---|---|---|---|---|---|
| 🗎 CONTENT | PREVIEWBLE CONTENT | | | | |
| All entries  2 | ▨ Serve localized content (2) | Lesson | 17 Feb 2021 | DRAFT | ▨ Approved |
| Lesson  1 | OTHER CONTENT | | | | |
| Lesson > Copy  1 | ☐ Content Management Lesson > Copy | Lesson > Copy | 17 Feb 2021 | DRAFT | No State |
| 🖼 MEDIA | | | | | |
| All assets  0 | | | | | |
| ⇅ WORKFLOWS  ••• | | | | | |
| ☐ First Draft  0 | | | | | |
| ☐ Review  0 | | | | | |
| ☐ Ready  0 | | | | | |
| ☐ In Production  0 | | | | | |

Lesson
Serve localized content (2)

[ Edit Selected Entry ]   Change

Platform: The Node.js example app

[ Preview ]

[ Remove from release ]

[ ▨ Approved  › ]

— 980

● Black Friday was scheduled successfully   ✕

Fig. 9K

Calendar 990

February 2021

| S | M | T | W | T | F | S |
|---|---|---|---|---|---|---|
| 31 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 1 | 2 | 3 | 4 | 5 | 6 |

FILTER BY TYPE

All
Releases
Single Entries
Assets

February 2021

WED 17
08:00 PM
Summary > copy
1 Lesson > Copy
 ⊕ PUBLISH

08:00 PM
Black Friday ← 992
Release: 2 Entries
 ⊕ PUBLISH

FRI 26
05:00 PM
New Releases
Release: 2 Entries
 ⊕ PUBLISH

06:00 PM
New Release
Release: 32 Entries, 3 Assets
 ⊕ PUBLISH         Image  +2

March 2021

WED 17
08:00 PM
Launch EAP
Release: 32 Entries, 3 Assets
 ⊕ PUBLISH         Image  +2

SUN 28
03:00 AM
Monthly Product Demo 1
Release: 32 Entries, 3 Assets
 ⊕ PUBLISH         Image  Image  Image TUE 30
05:00 PM
Test Release
 ⊕ PUBLISH

Team Pulitzer — The Example App

Space home | Content model | Content | Media | Apps ▾ | Settings ▾

Lesson
Serve localized content (2)

Editor | References | Tags NEW

Title (required)
Serve localized content (2)
27 characters
The name of the lesson; also the title for content editors to find entries in Contentful.
Maximum 256 characters.

Slug (required)
serve-localized-content
An autogenerated url-safe and human-readable identifier for this lesson.

Modules (required)

Lesson > Copy
Serve localized content > fetching   [DRAFT]   ⋯

Lesson > Code Snippets
Serve localized content > fetch code   [DRAFT]   ⋯

Lesson > Copy   [DRAFT]   ⋯

1000 ← Editor
1002 ← (Title field)
1004 ← Approved

General | Comments | Info

WORKFLOWS                    >
☐ Approved
☐ In Progress
   In Progress
☐ In Review
☐ Updated Required
   Updated Required View workflows dashboard

MISSING WIDGET

⚠ 5rhVsop2crPEKpt8wqcZ is saved in configuration, but not installed in this environment.

STATUS

| Release Releases EAP | | | | [PUBLISH] Fri, 30 Apr 2021 at 5:00 PM | Schedule ∨ |
|---|---|---|---|---|---|
| Content | | | | | + Add Content ∨  ⋯  ✕ |

| Filter by | | Title | Content Type | Last Updated | Status | Workflow |
|---|---|---|---|---|---|---|
| ⊟ CONTENT | | PREVIEWBLE CONTENT | | | | |
| All entries | 39 | ☐ Application development | Category | 10 Feb 2021 | CHANGED | ☐ Review |
| Category | 2 | ☐ Einstiegskurs | Category | 10 Feb 2021 | CHANGED | ☐ Review |
| Course | 1 | ☐ Hell SDKs | Course | 1 Feb 2021 | DRAFT | No State |
| Layout | 4 | ☐ Fetch all entries yo | Lesson | 17 Feb 2021 | DRAFT | ☐ In Progress |
| Layout > Hero Image | 1 | ☐ Serve localized content (2) | Lesson | 17 Feb 2021 | DRAFT | ☐ Approved |
| Lesson | 9 | ☐ Content model 2 | Lesson | 17 Feb 2021 | DRAFT | No State |
| Lesson > Code Snippets | 5 | ☐ Fetch draft content 2 | Lesson | 17 Feb 2021 | DRAFT | ☐ Update Required |
| Lesson > Copy | 14 | ☐ SDK basics 2 | Lesson | 17 Feb 2021 | DRAFT | No State |
| Lesson > Image | 3 | ☐ Content Management | Lesson | 17 Feb 2021 | DRAFT | No State |
| ⊞ MEDIA | | ☐ APIs (updated) | Lesson | | | |
| All assets | 1 | ● 1 entities did not pass validation ✕ | | | | |
| ⇅ WORKFLOWS | ⋯ | | | | | |
| ☐ First Draft | 0 | | | | | |
| ☐ Review | 2 | | | | | |
| ☐ Ready | 0 | | | | | |
| ☐ In Production | 0 | | | | | |

1112 → Lesson > Code Snippets
● Untitled — 1114

[ Edit Selected Entry ]
[ Remove from release ] — 1116

Learning Center / Help Center

Media | ?

Shared views — My views

- All
- ▼ Status (4)
  - Published
  - Changed
  - Draft
  - Archived
- ▼ File Type (12)
  - Attachment
  - Plain text
  - Image
  - Audio
  - Video
  - Rich text

[+] Add Folder

---

Space home | Content model | Content | Media | Apps ▾ | Settings ▾ | ? | 🔍 | (RS) ▾

1500

Type to search for assets | ≡ Filter | Save as view | Add Asset

177 assets found — 1502 — Usage: 594 / 500000 entries and assets

| ☐ | Prev... | Name | Dimensions | Type | Updated | By | Status |
|---|---|---|---|---|---|---|---|
| ☐ | | entry-editor | 2560 x 167... | Image.png | a few second... | Me | Published |
| ☐ | | Contentful web app ov... | 2728 x 180... | Image.png | 4 minutes a... | Me | Published |
| ☐ | | manage-tags-permission | 1195 x 587 px | Image.png | Tue, 2:11 PM | Me | Published |
| ☐ | | search-tags-columns | 1674 x 599 px | Image.png | Tue, 1:58 PM | Me | Published |
| ☐ | | tags-bulk-editor | 2430 x 126... | Image.png | Jun 26, 2020 | Me | Published |
| ☐ | | add-remove-tags-option | 1912 x 836 px | Image.png | Jun 19, 2020 | Malin Sofrone | Published |
| ☐ | | add-new-environment | 500 x 323 px | Image.png | Jun 11, 2020 | Me | Published |
| ☐ | | content-preview-disco... | 500 x 306 px | Image.png | Jun 11, 2020 | Me | Published |
| ☐ | | content-preview | 500 x 322 px | Image.png | Jun 11, 2020 | Me | Published |
| ☐ | | final-preview | 500 x 384 px | Image.png | Jun 11, 2020 | Me | Published |
| ☐ | | tags-entry | 2444 x 756... | Image.png | Jun 10, 2020 | Me | Published |

Fig. 16

SYSTEMS FOR LAUNCHING CONTENT FOR PUBLICATION

CLAIM OF PRIORITY

This application claims priority as a continuation and the benefit of U.S. patent application Ser. No. 17/471,152 filed on Sep. 9, 2021, entitled "Systems for Launching Content for Publication," which is a further continuation of U.S. patent application Ser. No. 17/202,142 filed on Mar. 15, 2021 (U.S. Pat. No. 11,409,835, issued on Aug. 9, 2022), entitled "Systems for Launching Content for Publication," which is a further continuation of U.S. patent application Ser. No. 17/201,854 filed on Mar. 15, 2021 (U.S. Pat. No. 11,210,364, issued on Dec. 28, 2021), entitled "Methods for Launching Content for Publication," the disclosures of which are incorporated herein by reference in their entirety for all purposes.

BACKGROUND

1. Field of the Disclosure

The present disclosure relates to methods and systems for launching content of a content management system for publication.

2. Description of the Related Art

A content management system (CMS) is useful for enabling organizations to create and edit digital content in a structured manner A given organization's content can be broken down into modular reusable components, enabling deployment of content in a variety of combinations to suit different presentation contexts. Further, the appearance of content can be adjusted to suit the presentation context at the time it is retrieved and presented to the consuming end user. However, while such content components provide many advantages in terms of content editing and management, there can be an exceedingly large number of content components, and publication of a given project can entail processing of thousands of content components at a time, which can be cumbersome to execute, both from a user standpoint, and from the standpoint of the CMS serving the content components.

Batch processing of content publication can be automated. However, this can lead to undesirable effects if some content is successfully published while other content in the batch fails to publish for some reason. A webpage might be only partially updated or could be missing content as the result of a partially successful batch publication process.

It is in this context that implementations of the disclosure arise.

SUMMARY

Implementations of the present disclosure include methods and systems relating to launching content of a CMS for publication.

In one embodiment, a method for launching content for publication using a content management system (CMS) is provided. The method includes enabling editing of entities using an editor application associated with the CMS, the editing includes authoring fields for each entity. The method includes receiving selection of a group of entities, via a launch interface of the CMS. The selection is for publishing the group of entities. The method includes generating, responsive to the selection, an API call to the CMS. The API call is defined to trigger initiation of a validation process to validate each entity in the group of entities. The validation process is executed in a draft entity store of the CMS that is created for said validation without requiring separate API calls for validating each entity in the group of entities.

In some implementations, responsive to the API call to the CMS, each entity in the group of entities is fetched to the draft entity store to enable said validation. A loop of said validation process is used to validate each entity in the group of entities.

In some implementations, the CMS provides the launch interface for said selection of the group of entities for publishing, and said selection is received from a user device having access to the CMS.

In some implementations, after each entity in the group of entities is validated during the validation process, a validation indicator is associated with the respective entity in the group of entities.

In some implementations, following completion of the validation process, a validation indicator that identifies a failure of an entity to pass validation causes a non-publication of the group of entities in entirety.

In some implementations, the validation indicator that identifies the failure further triggers identification of the entity that failed to pass validation in the launch interface of the CMS, and an option to access an editing interface of the editor application to edit one or more fields of the entity that failed to enable passing of said validation.

In some implementations, the validation process, once initiated, proceeds automatically without requiring said separate API calls and input from a user device to separately initiate publication of each of the entities in the group of entities.

In some implementations, following completion of the validation process. Successful validation of the group of entities triggers or causes setting each entity in the group of entities to a published status.

In some implementations, the setting of each entity in the group of entities to the published status enables retrieval of each entity from the CMS through a content delivery API of the CMS.

In some implementations, the successful validation of the group of entities further triggers notifications to caching systems of the CMS.

In some implementations, an asynchronous process triggers the initiation of the validation process, the asynchronous process configured to limit a rate of access to entities of the CMS.

In some implementations, the launch interface enables scheduling of the group of entities for publication at a predefined date and time, and wherein generating the API call is further responsive to reaching the predefined date and time.

In some implementations, the launch interface further enables a calendar view of groups of entities that are scheduled for publication.

In some implementations, the calendar view is configured to provide a calendar configured to indicate days having publication events scheduled thereon.

In some implementations, the calendar view provides a chronological listing of the groups of entities that are scheduled for publication.

In some implementations, the launch interface further enables setting of user-defined workflow status tags to the entities.

In another embodiment, a method is provided for enabling efficient launching of content associated with entities in a CMS. The method includes providing access to the content management system (CMS) over the Internet to a user device having an account with the CMS. The CMS provides a launch interface for publishing content via the CMS. The method includes enabling editing of entities defined content managed via the CMS. The editing is enabled using an editor application associated with the CMS. The editing includes defining one or more fields for each entity. The method includes receiving selection of a group of entities, via the launch interface of the CMS. The selection is for publishing the group of entities. The method includes generating, responsive to the selection, an API call to the CMS. The API call causes initiation of a validation process by the CMS to validate each entity in the group of entities. The validation process, once initiated, proceeds automatically without requiring additional API calls and input from the user device to separately initiate publication of each of the entities in the group of entities.

In another embodiment, a system for launching content for publication using a content management system (CMS) is provided. The system includes a server of a plurality of servers that is configured for enabling editing of entities using an editor application associated with the CMS. The editing includes authoring fields for each entity. The system includes a server of the plurality of servers that is configured for receiving selection of a group of entities, via a launch interface of the CMS. The selection is for publishing the group of entities. The system includes a server of the plurality of servers that is configured for generating, responsive to the selection, an API call to the CMS. The API call is defined to trigger initiation of a validation process to validate each entity in the group of entities. The validation process is executed in a draft entity store of the CMS that is created for said validation without requiring separate API calls for validating each entity in the group of entities.

In another embodiment a system is provided. The system includes a server of a plurality of servers that is configured to provide access to a content management system (CMS) over the Internet to a user device having an account with the CMS. The CMS provides a launch interface for publishing content via the CMS. The system includes a server of the plurality of servers that is configured for enabling editing of entities defined content managed via the CMS. The editing is enabled using an editor application associated with the CMS. The editing includes defining one or more fields for each entity. The system includes a server of the plurality of servers that is configured for receiving selection of a group of entities, via the launch interface of the CMS. The selection is for publishing the group of entities. The system includes generating, responsive to the selection, an API call to the CMS. The API call causes initiation of a validation process by the CMS to validate each entity in the group of entities. The validation process, once initiated, proceeds automatically without requiring additional API calls and input from the user device to separately initiate publication of each of the entities in the group of entities.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 7A-7B illustrate workflow interfaces for a given release, in accordance with implementations of the disclosure.

FIGS. 8A-8E illustrate reference tree views and related interfaces for a collection of entries in an environment, in accordance with implementations of the disclosure.

FIGS. 9A-9L illustrate interfaces for creating and working with releases and associated content, in accordance with implementations of the disclosure.

FIGS. 10A-10C illustrate interfaces for editing a content entry and adding to a release, in accordance with implementations of the disclosure.

FIGS. 11A-11C illustrate content views of a release and associated editing of an entry that failed validation, in accordance with implementations of the disclosure.

FIG. 15 illustrates an interface view of a Media tab of a CMS editorial application, in accordance with implementations of the disclosure.

FIG. 16 illustrates an interface view of an Asset editor of a CMS editorial application for editing an Asset, in accordance with implementations of the disclosure.

DETAILED DESCRIPTION

The following implementations of the present disclosure provide methods and systems relating to launching content of a CMS for publication. It will be obvious, however, to one skilled in the art, that the present disclosure may be practiced without some or all of the specific details presently described. In other instances, well known process operations have not been described in detail in order not to unnecessarily obscure the present disclosure.

A content management system (CMS) in accordance with implementations of the disclosure structures content using a system of content entries and assets as described in further detail below. Content entries and assets are created and edited in draft form and eventually published, making them available for retrieval and presentation through various contexts such as a webpage, mobile app, etc. In some instances, launching publication of a project can entail a very large number of entries and assets, numbering in the thousands or even more.

Typically, publication of a large number of entities entails a batch process that sequentially validates and publishes each entity. However, this can lead to issues of partial publication, whereby some entities are published while others fail to pass validation and are therefore not published. The end result can be that portions of content are missing or appear broken, such as part of a webpage or website missing. Further, the result may be incongruous, as in when part of a webpage is updated, while another part fails to update and now does not match because it was not overridden with new content (e.g. a website is updated with content for a new Christmas sale, but the Black Friday ad is still present).

Additionally, sequential publication of a batch of entries can be resource intensive in terms of network communication and processing compute required, as each entity requires its own validation and publication event to be executed, with compounding overhead.

In view of the above, implementations of the present disclosure provide solutions to these problems, by enabling bulk publication of entities in a manner such that all the entities in a batch either publish together or are not published at all, thereby avoiding the problems of partial batch publication. Furthermore, this is accomplished through a system and method that minimizes network and processing overhead.

Implementations of the present disclosure are further drawn to systems and methods leveraging the improved bulk entity processing provided herein. Entities can be grouped into releases which can be scheduled for publication at a future date and time. Calendar viewing of releases is further provided, enabling a user to easily view upcoming as well as past releases. Custom workflow tagging is implemented to enable users to assign custom-defined status indicators to individual pieces of content, further enhancing tracking of content development across users of the CMS.

Figure 1:
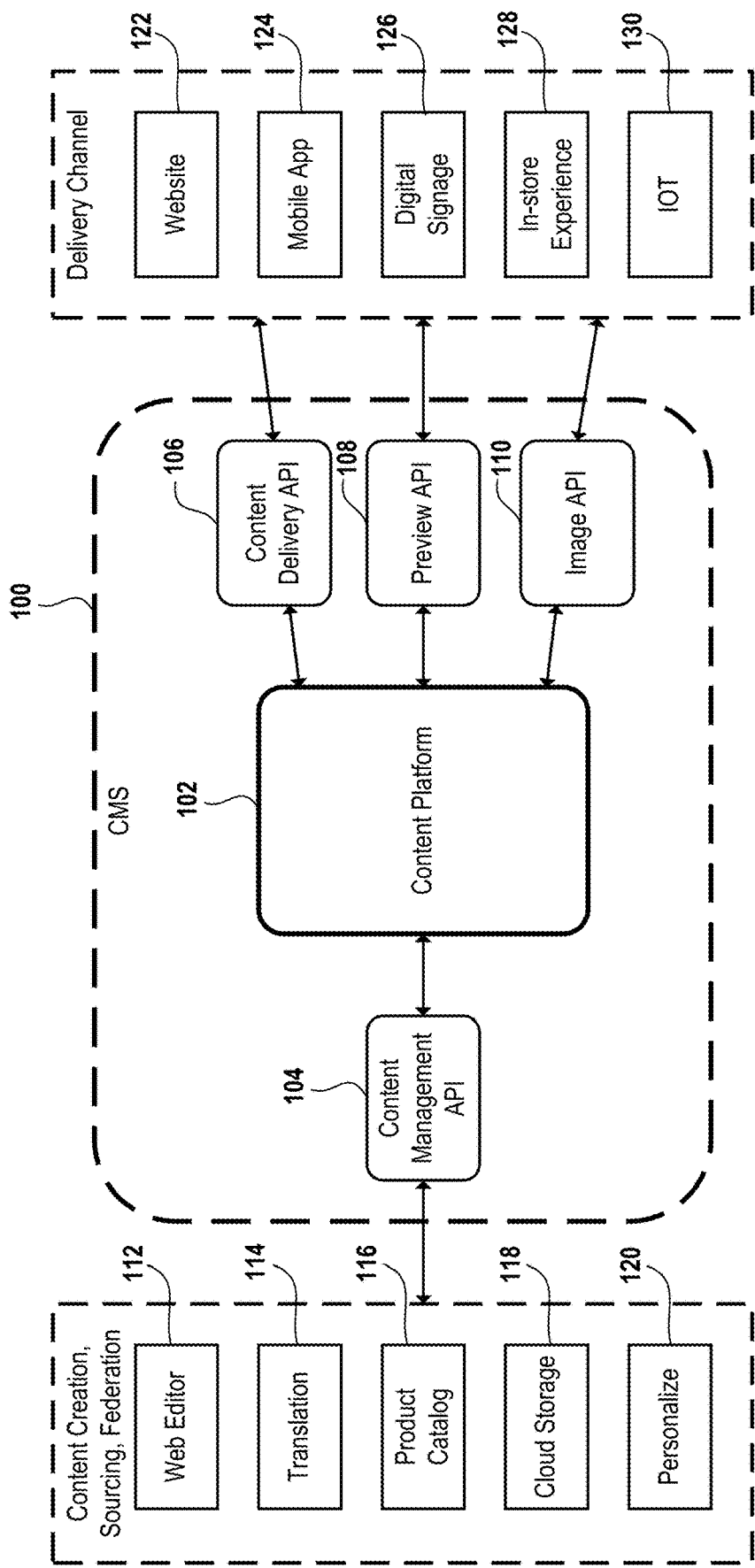
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g. JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g. an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to effect content personalization via the content management API 104. Personalization information can be utilized to enable customization of content or downstream customization of content delivery. Examples of personalization information can include user demographic information (e.g. age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g. website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g. preview deployment of a website or a preview build of a mobile app, that allows content managers and authors to view their work in-context, as if it were published, using a preview access token as though it were delivered by the content delivery API 106.

In some implementations, an images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g. HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geolocation. In some implementations, user interface (UI) extensions are supported, to enable building of customized editing experiences for the web editor. In some implementations, app installations are supported, extending and expanding the capabilities of the CMS web application.

Figure 2:
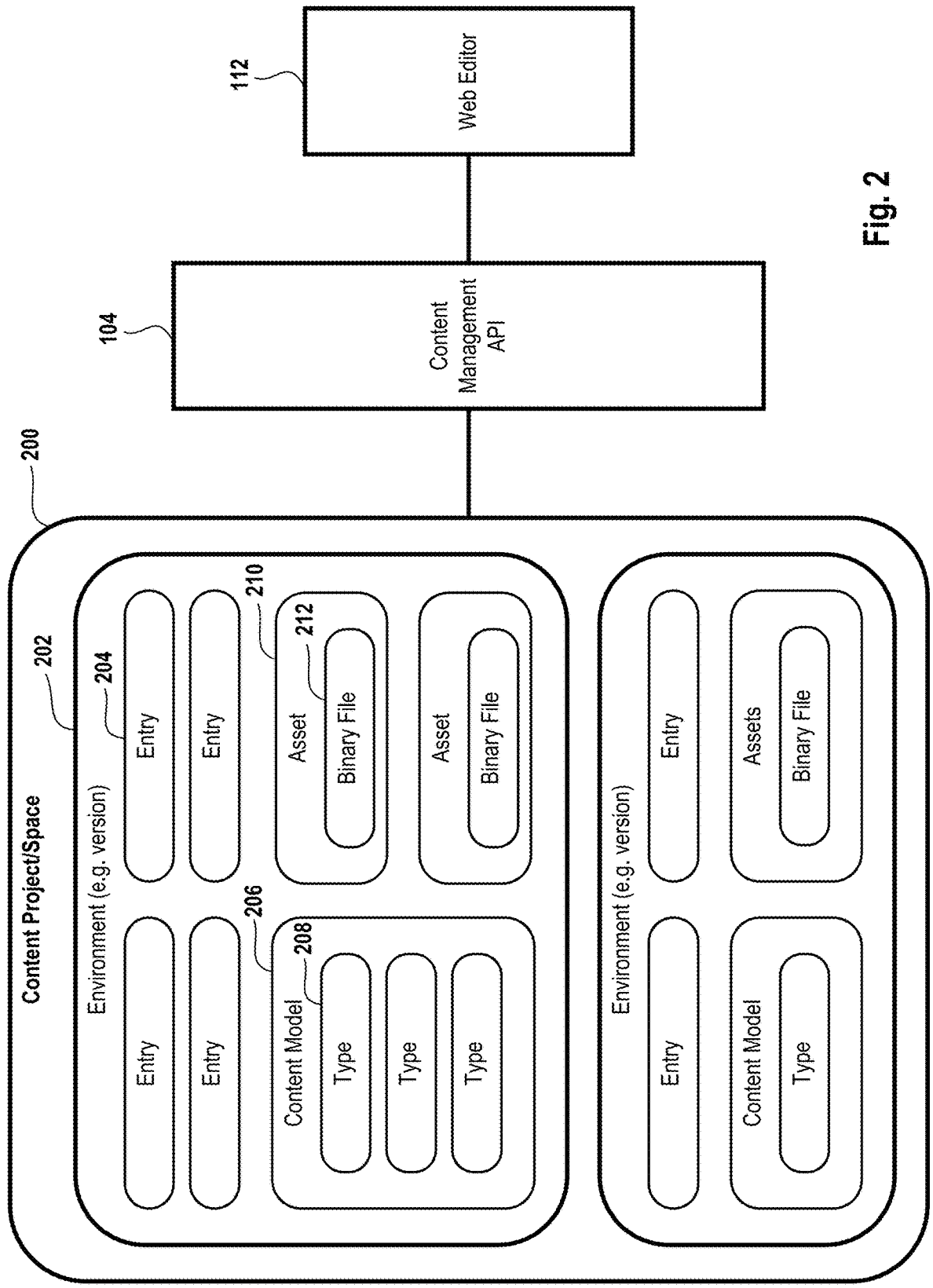
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g. system properties, name of the content type, description of the content type, listing of fields, ID of main field used for display, etc.). Each content type is flexibly configurable, further consisting of user-defined fields, which in some implementations, correspond to a JSON type (e.g. string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g. entry 204), which represent textual or structural information based on the content type used. Items can also be assets (e.g. asset 210), which can include binary files (e.g. binary file 212), such as images, videos or documents, along with metadata. In some implementations, assets have the following fields: the name, description and attached file. In some implementations, these fields are present in each enabled locale, such that the same asset can reference multiple names, descriptions, and files depending on the locales for the project/space in which the asset is defined.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g. only allow Menu Items for fields.menuItems). Asset links can be validated by file type. (e.g. only allow Images for fields.photo). Links on the Content Delivery API are resolved using the published entries and assets, while links on the Content Preview API will resolve using the draft entries and assets.

Figure 3:
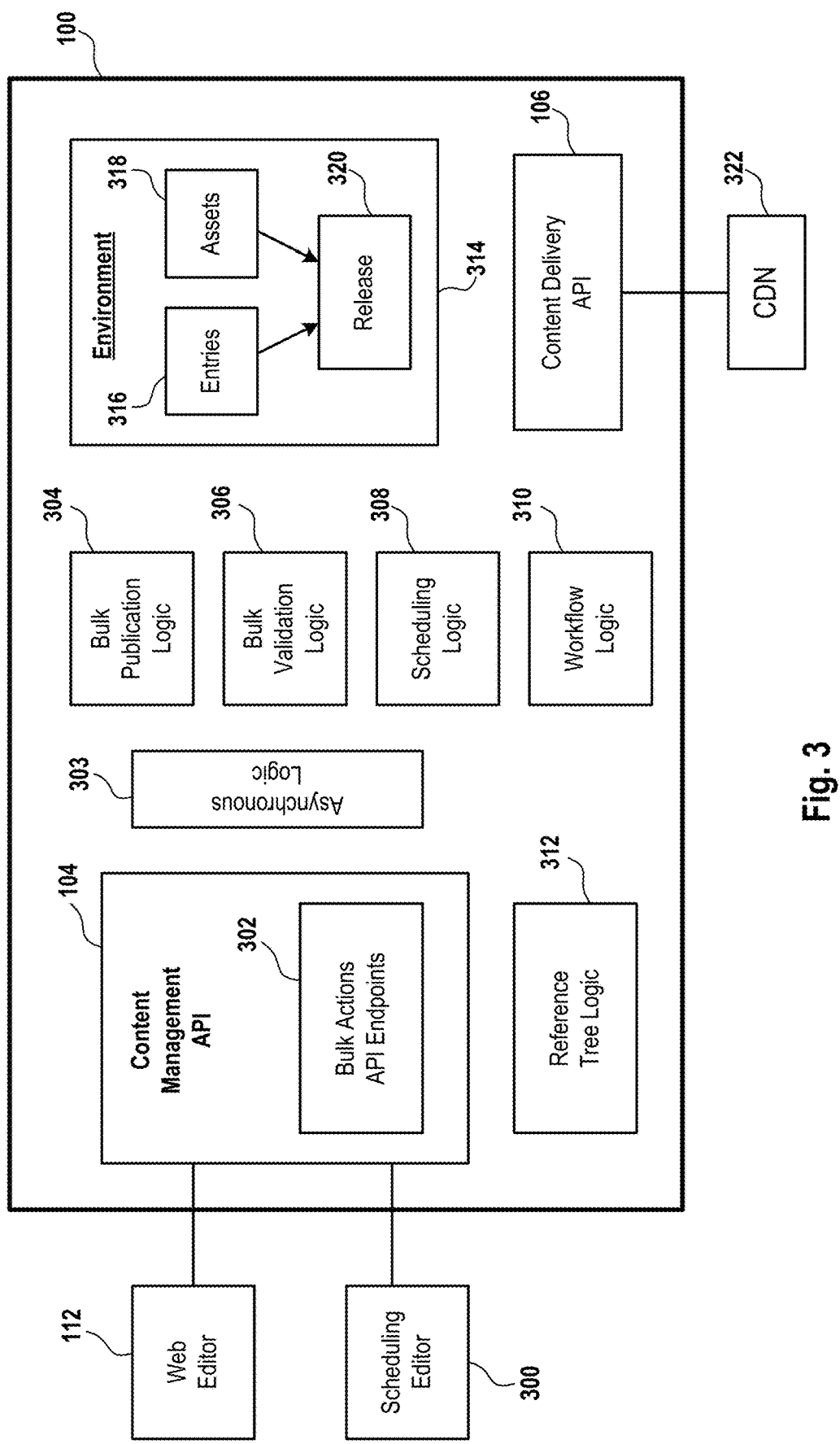
FIG. 3 conceptually illustrates a content management system (CMS) configured to provide bulk publication of content entries and associated scheduling functionality, in accordance with implementations of the disclosure.

FIG. 3 conceptually illustrates a content management system (CMS) configured to provide bulk publication of content entries and associated scheduling functionality, in accordance with implementations of the disclosure.

As shown, the CMS 100 stores structured content in the form of content entries 316 and assets 318, which are defined for a given (space) environment 314. The environment 314 is accessible for editing of the entries 316 and assets 318 via a content management API 104. For example, the web editor 112 provides functionality for editing the entries and assets, generating API calls to the content management API 104 to effect changes to the entries and assets in the environment 314. It will be appreciated that the web editor 112 is a client of the CMS 100, providing an interface for content editing and communicating with the CMS 100 over a network such as the Internet. In some implementations, the web editor 112 is executed by and presented through a browser of a client device.

The content management API 104 includes bulk actions API endpoints 302, which are the API endpoints for effecting bulk validation, publication and unpublication actions for a group of entries and assets. Publishing content will add the content to the content delivery API, whereas unpublishing content will remove it from the content delivery API. To this end, the CMS 100 includes bulk publication/unpublication logic 304, which implements methods for publishing/unpublishing a group of entries and assets. The CMS 100 further includes bulk validation logic 306, which implements methods for validating a group of entries and assets. As validation typically occurs as a prerequisite to publication, it will be appreciated that in some implementations, the bulk publication logic 304 may call the bulk validation logic 306 (e.g. via an API call to one of the bulk actions API endpoints 302), to validate the group of entries and assets prior to publishing them. However, it is noted that the bulk validation logic 306 can be executed independent of any specific publication event, enabling editors to verify that content is ready for publication at any time. The specific operations entailed in validation and publication of groups of entities are described in further detail below.

In some implementations, the bulk publication/unpublication logic 304 and/or the bulk validation logic 306 are also capable of managing events so as to prevent overloading of the system. For example, this may be based on assessment of the number of requests and the size of the requests (e.g. based on the number of entries and assets involved, the number of fields within the entries and assets, the complexity of the validation rules, etc.).

It will be appreciated that the bulk publication/unpublication and validation operations can be instantiated through various editorial pathways in accordance with various implementations of the disclosure. For example, in some implementations, the CMS 100 includes reference tree logic 312, which enables visualization of the hierarchical structure of linked entries and assets through the interface provided by the web editor 112. Through this visualization, a content editor may select a plurality of entries and assets, and initiate a bulk validation or publication operation for the selected plurality of entries in assets. In some implementations, the reference tree logic 312 is implemented by, or included in or otherwise associated to, the web editor 112. In some implementations, the reference tree logic 312 affects calls to the content management API in order to obtain data regarding linked/referenced entries in the environment 314.

In some implementations, the CMS 100 also provides a scheduling editor 300, which is another client to the CMS 100. In some implementations, the scheduling editor 300 is executed and presented through a browser of a client device, accessing the CMS 100 over a network such as the Internet. Broadly speaking, the scheduling editor 300 provides functionality for enabling a user to group entries and assets into releases that can be scheduled for publishing or unpublishing at a designated date and time. To carry out such activity, the CMS 100 implements scheduling logic 308 that handles the management and scheduling of releases. By way of example in the illustrated implementation, some of the entries 316 and some of the assets 318 can be added to a single release 320 in the environment 314. This release 320 can then be scheduled for publication at a selected date and time in the future, at which point validation and publication of the release will automatically occur.

In some implementations, the CMS 100 further implements workflow logic 310, which enables creation of custom status tags for entries and assets that are part of a given release. This enables the assignment of user-defined status indicators to suit an organization's needs, and facilitates visibility into tracking the progress of content as it is being prepared for publication.

It will be appreciated that the above-described scheduling and workflow management functionalities are accessible through the scheduling editor 300, which provides an interface to enable users to create, edit and schedule releases, as well as assign and view workflow status tags of entries and assets. Together, these functionalities provide intuitive interfacing with content at a less granular level than that provided by the web editor 112, enabling a user of the scheduling editor 300 to focus more on the publication of content rather than the editing of individual pieces of content. However, it is noted that integration of these services and interfaces is further configured to provide easy access to edit individual content entries and assets if desired.

The result of publication of content, be it in the form of a published release or published individual entries or assets, is to make the published content entries and assets available for retrieval through a content delivery API 106 of the CMS 100. In some implementations, published content is delivered to a global content delivery network 322, which may cache the published content for delivery from the edge to client applications/devices.

A challenge when publishing a group of content is validating that the content is correct with all of the proposed changes to the multiple pieces of content. When publishing only a single piece of content, validation checks can be performed against existing published content. However, when publishing a group of content, it is important to take into account all of the entities and changes that are intended to be published in a single bulk action, so that if something fails to publish then the group operation can be readily canceled in whole. Accordingly, implementations of the present disclosure provide methods and systems for bulk publication and validation of a group of content entries and assets, verifying that the group is suitable for publication, and then implementing the publication through a database transaction and also calling downstream systems to ensure that they are properly updated with the new version of content.

Figure 4:
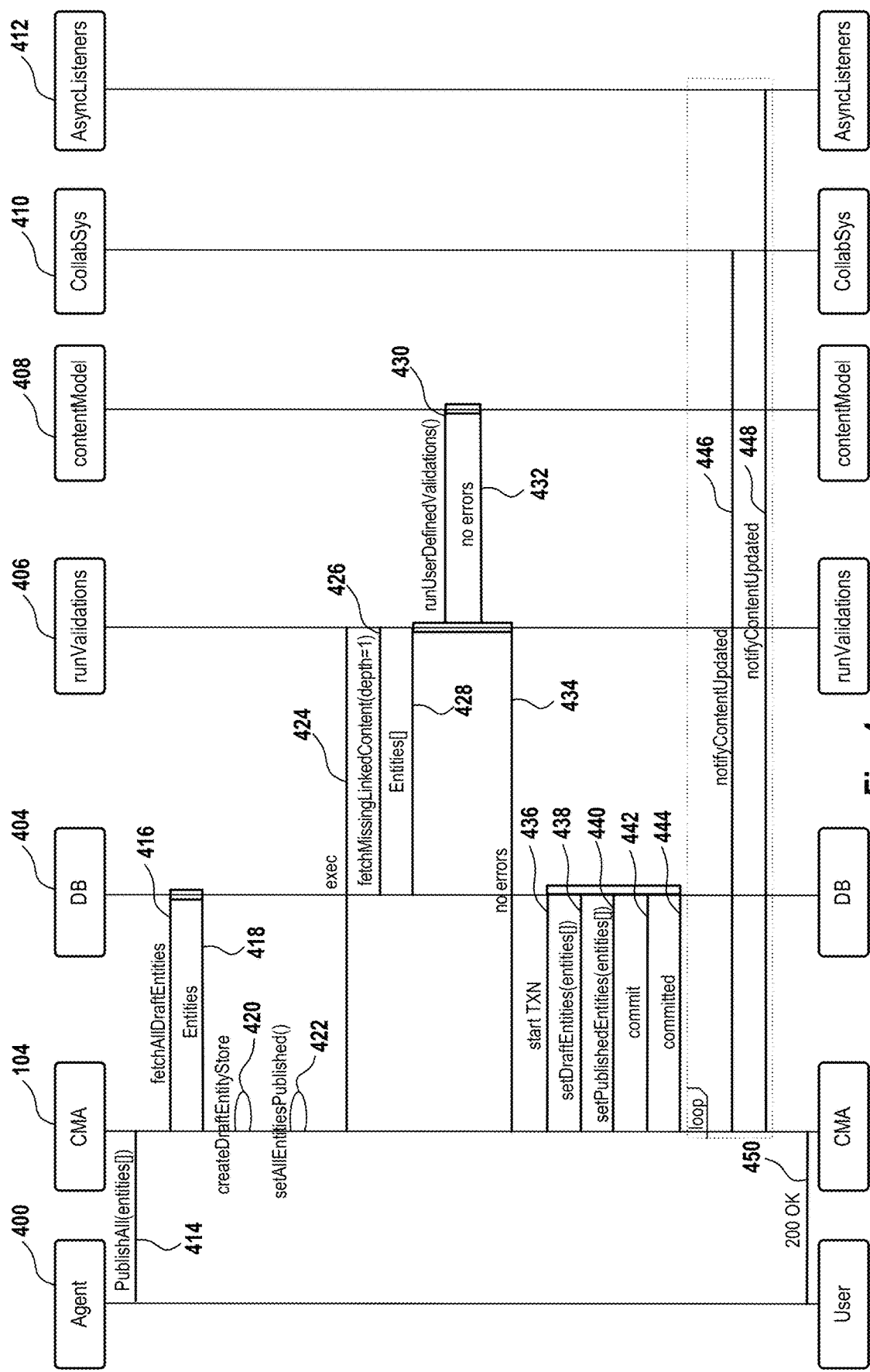
FIG. 4 conceptually illustrates a method for performing a bulk publication operation on a group of entities (content entries and assets), in accordance with implementations of the disclosure.

FIG. 4 conceptually illustrates a method for performing a bulk publication operation on a group of entities (content entries and assets), in accordance with implementations of the disclosure.

At method operation 414, an agent 400 makes an API call to the content management API 104. The agent 400 can be a client or logical entity of the CMS initiating a bulk entity publishing operation in accordance with implementations of the disclosure. For example, in various implementations, the agent 400 can be any of the web editor 112, the scheduling editor 300, or scheduling logic 308. The API call can be to a bulk actions API endpoint as described above. In some implementations, the API call is configured to pass a list of entities to the content management API for publication.

In response, at method operation 416, the content management API 104 calls out to a content database 404 in which the content entities are stored. More specifically, the method operation 416 communicates a request to fetch the listed entities that are in draft status (i.e. entries/assets that are not already published). The content database 404 returns the draft entities at method operation 418.

At method operation 420, the content management API sets up a draft entity store that is a local workspace/sandbox. At method operation 422, within the draft entity store, the content management API sets the fetched entities to a published state. It will be appreciated that the draft entity store acts as a simulated environment in which simulation of the fetched entities being set to a "published" state is achieved for purposes of validation.

At method operation 424, a runValidations process 406 is executed, which performs validations against the entities in the draft entity store. Initially, at method operation 426, the runValidations process 406 checks whether the draft entity store includes all of the content referenced by the entities present in the draft entity store (e.g. entries/assets referenced by entities already fetched), and if not, then fetches any missing linked content (e.g. depth of one) from the content database 404. At method operation 428, the content database 428 returns the missing entities, and these are added to the draft entity store.

By way of example without limitation, there can be various validation constraints such as uniqueness constraints or requirements of a given entity being present before another entity can be validated. Such constraints might not be met in the production entity store (e.g. some content might not be present). But by setting up a draft entity store and setting the fetched entities to a simulated published state within that draft entity store, then this enables simulation of the changes embodied in the fetched entities being present so that they can be accounted for when performing validations. In this way, validations that are dependent on other entities in the group can be performed successfully. Further, this enables validations to be performed without needing to fetch content from the production entity store.

At method operation 430, the runValidations process 406 runs user-defined validations, checking whether the entities in the draft entity store meet validation constraints that have been custom defined in the content model 408 of the (space) environment. If the validation constraints are met, then at method operation 432, no errors are returned, and at method operation 434, the runValidations process returns an indication of no errors to the content management API 104.

At method operation 436, in response to passing validations with no errors, then the content management API 104 initiates a transaction on the content database 404. At method operation 438, optionally the transaction is defined to include incrementing the version number of draft entries. At method operation 440, the transaction is further defined to create newly published entries or update already published entries with their new content and increment their version numbers. In general, these changes in the publishing process effectively create a "public" snapshot of the draft entry, and this snapshot becomes the published entry. So publishing either produces a new published entry if the draft was not published before, or updates the published entry if the draft was already published. At method operation 442, the content management API 104 executes a commit for the transaction, and at method operation 444, the content database returns a committed confirmation to the content management API 104.

Following the committal of the publishing of the group of entities, then the content management API 104 notifies additional systems of the CMS 100 that need to be refreshed as a result of the new content publication, such as cache and validation systems and various user interfaces that need to be updated. For example, at method operation 446, the content management API 104 notifies collaborative editing systems 410 that new content has been published. And at method operation 448, the content management API 104 notifies asynchronous listeners 412 that new content has been published. In some implementations, the notification operations are part of a looped process. At method operation 450, the content management API 104 returns an acknowledgement to the agent 400 indicating that the bulk publication operation was successfully carried out.

It will be appreciated that the bulk publication process of the present disclosure provides many advantages over prior implementations. In prior systems, publication of entities was handled on an individual basis, such that each entity required its own API call and separate sandbox validation, publishing event and downstream notifications. This resulted in lengthy processing times due to the amount of network communication and processing required to process each entity. However, in accordance with implementations of the disclosure, bulk publication of a group of entities requires only a single API call, and network communication and processing is minimized, with only a single sandbox being implemented for validation of the entire group of entities, and notifications of downstream systems being consolidated.

Furthermore, prior implementations performed validations for a single entry against the already published content. However, in the bulk publication process of the present disclosure, since validations are performed as a group, then the total changes represented by the new content can be simulated in a sandbox/workspace, and then validations run against that simulated new version of the content. This is advantageous as validation of a single entry only takes into account the content that has already been published but not the content that will be published. Whereas in the bulk publication process, the state of the new content to be published can also be taken into account when performing validations.

With continued reference to FIG. 3, in some implementations, the bulk validation logic 306 is defined to include some or all of the validation-related operations 424, 426, 428, 430, 432, and 434 in accordance with FIG. 4. In some implementations, the bulk publication logic 304 is defined to include some or all of the publication-related operations 414, 416, 418, 420, 422, 424, 434, 436, 438, 440, 442, 444, 446, 448, and 450 in accordance with FIG. 4. In some implementations, some or all of the bulk publication logic 304 and/or the bulk validation logic 306 is defined as part of the content management API 104.

In some implementations, for purposes of enabling rate limiting and enhancing system responsiveness, the presently described bulk publication and/or bulk validation can be implemented via an asynchronous process. With continued reference to FIG. 3, an asynchronous logic 303 implements a process configured to control how many active publishes and/or validations are occurring at a given time, so as to limit the activity on the content database and prevent excessive calls or transactions. Furthermore, such an asynchronous process is configured to provide, and respond to requests for, status updates regarding previously initiated publication and/or validation operations.

Figure 5:
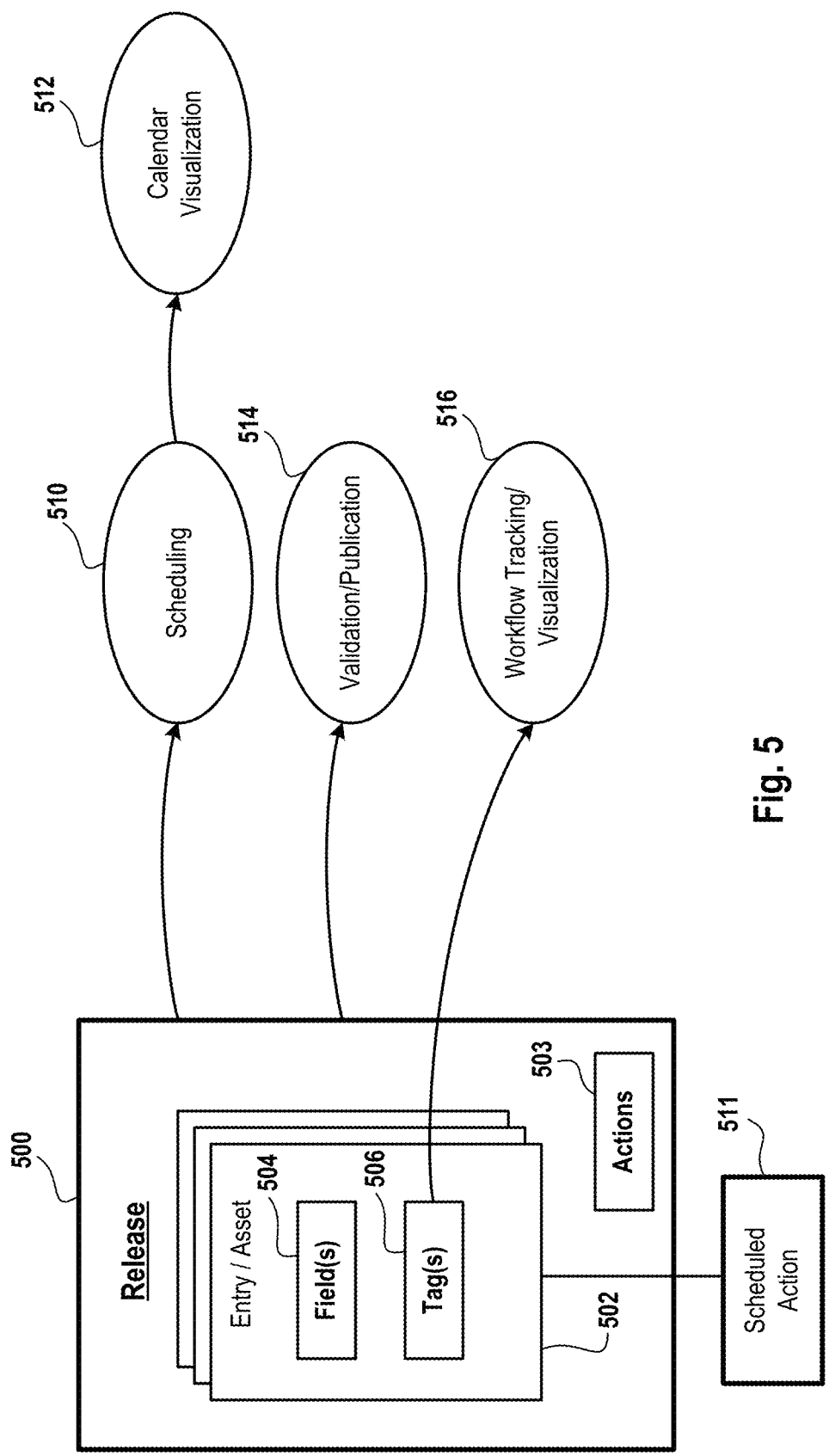
FIG. 5 conceptually illustrates a release and associated functionality of a CMS, in accordance with implementations of the disclosure.

FIG. 5 conceptually illustrates a release and associated functionality of a CMS, in accordance with implementations of the disclosure.

A release defines a group of entities (content entries and/or assets) that can be scheduled for automated publication at a predefined date and time. A release is a self-contained entity that exists until deleted. Multiple actions can be applied and multiple scheduled actions can use a given release. Actions applied to a release are atomic in the sense that they are applied to all entities of the release at the same time as part of a single operation, so that the entire operation will either succeed or fail as a whole.

In the illustrated implementation, a release 500 is defined to include entities 502. A given entity may have a number of fields 504, include link type fields that reference other entities. In some implementations, a given entity further includes one or more tags 506, which can be used to facilitate searches as well as workflows as described herein.

A scheduling process 510 is implemented to schedule the release 500 for publication or unpublication. And when scheduled for publication/unpublication, then the release 500 will appear as part of a calendar visualization 512, as further described herein. In some implementations, scheduling of the release 500 for an action creates a scheduled action object 511 that can link to the Release 500 object.

Additionally, a release actions object 503 is configured as a record of actions associated with the release 500. In this manner, any applied action to the release 500 is persisted with the release 500 object itself, as the release actions object 503 maintains a list of changes that have been performed on this release (e.g. validate, publish, unpublish).

It will be appreciated that the release 500 can also be separately validated or published (reference. 514) on demand. For example, a user may wish to validate a release prior to scheduling it for publication, to ensure that the release is fully ready for successful publication.

Additionally, the tags 506 can include workflow tags which are custom defined tags facilitating workflow tracking and visualization 516, as further described herein.

Figure 6:
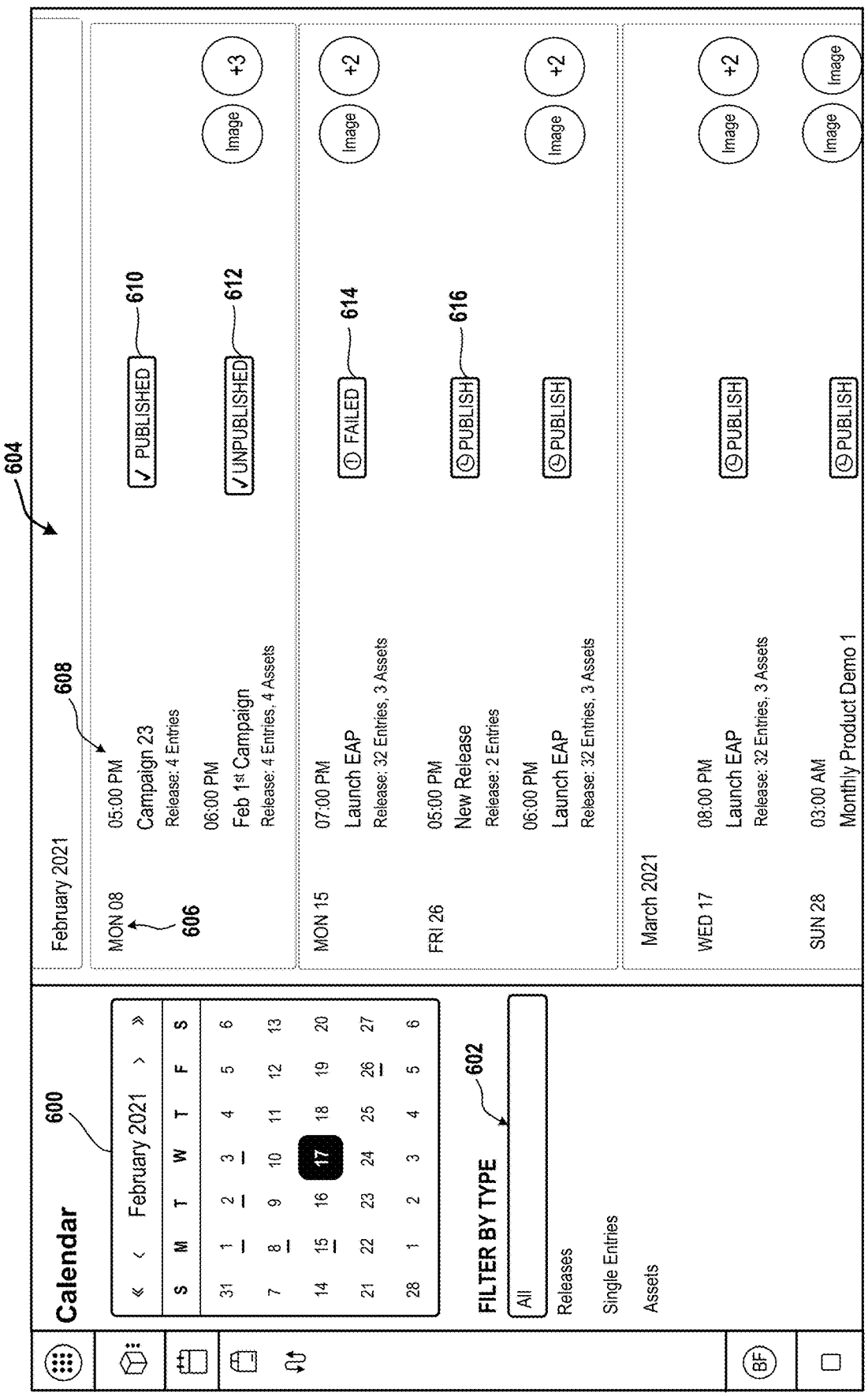
FIG. 6 illustrates a calendar interface for viewing scheduled releases, in accordance with implementations of the disclosure.

FIG. 6 illustrates a calendar interface for viewing scheduled releases, in accordance with implementations of the disclosure.

In the illustrated implementation, a calendar view of a user interface provided by the scheduling editor 300 is shown. A calendar 600 is displayed, with particular dates highlighted (e.g. underlined) to indicate which dates have scheduled publish or unpublish actions. A filter section 602 enables filtering of the listing 604 of scheduled releases. In the illustrated implementation, the listing can be filtered to show releases, single entries, assets, or all of these entities. It will be appreciated that individual entries or assets can be scheduled to publish/unpublish, and in addition to scheduled releases, these can be shown in the listing 604.

The listing 604 displays scheduled releases, entries, and/or assets in chronological order of scheduled date/time. In some implementations, for a given entity, the listing 604 displays the date (e.g. ref. 606) and time (e.g. ref. 608) of its scheduled event. Additionally, the type or status of the scheduled event is shown. Examples include a "published" indicator 610 indicating that a publication event was successfully completed, an "unpublished" indicator 612 indicating that an unpublish event was successfully completed, a "failed" indicator 614 indicating that an intended action failed to be carried out (e.g. due to failed validation), a "publish" indicator 616 indicating that the entity is scheduled for future publication, an "unpublish" indicator (not shown) indicating that the entity is scheduled for future unpublishing.

It will be appreciated that the illustrated calendar view provides an intuitive way to view past and upcoming scheduled events. The calendar 600 enables easy identification of timing patterns in publication. It will be appreciated that selection of a given day in the calendar 600 scrolls the listing 604 to the corresponding date to reveal the scheduled entities for that day.

FIG. 7A illustrates a workflow interface for a given release, in accordance with implementations of the disclosure.

The illustrated workflow interface can be a view provided through the user interface of the scheduling editor 300, in accordance with implementations of the disclosure. A listing 702 of entities in the release is shown. A filter section 700 enables filtering of the listing 702 by workflow status tag. That is, the filter section 700 displays the various possible workflow status tags which are used to tag entities (entries and/or assets), and the user may select any or all of the given workflow status tags to filter the listing 702.

In the illustrated implementation, the listing 702 provides various descriptive information about entities in the release, such as the name 704, content type 706, date of last update 708, author 710, and publication status 712 (e.g. draft, published or changed).

A configure button 714 is selectable to navigate to a workflow configuration interface as described below.

FIG. 7B illustrates a workflow configuration interface for configuring a workflow, in accordance with implementations of the disclosure.

As described, the workflow functionality entails creation and assignment of custom user-defined tags to entities in the CMS. These tags can be used to track the status of a given entity using custom descriptors. In the illustrated implementation, a workflow tag editing section 720 provides a listing of the available tags for editing. Tags can be defined, named, edited and ordered via the tag editing section 720. The order of the tags is configurable to control the order in which the tags are presented to a user of the system, so that they can view the various status possibilities and their order when utilizing the workflow functionality. An add button 722 is selectable to enable creation of a new workflow status tag to be added to the workflow.

In a content types section 724 of the workflow configuration interface, the workflow functionality can be assigned to the various content types of the content model, which are listed and selectable to add the functionality as shown. That is, when selected, then the content entries of the selected content type will have the ability to set the workflow status tags in association therewith. For example, a user working on a given entry will be able to set the workflow status tag for the entry, thereby indicating the current status of the entry for other users.

Figure 8A:
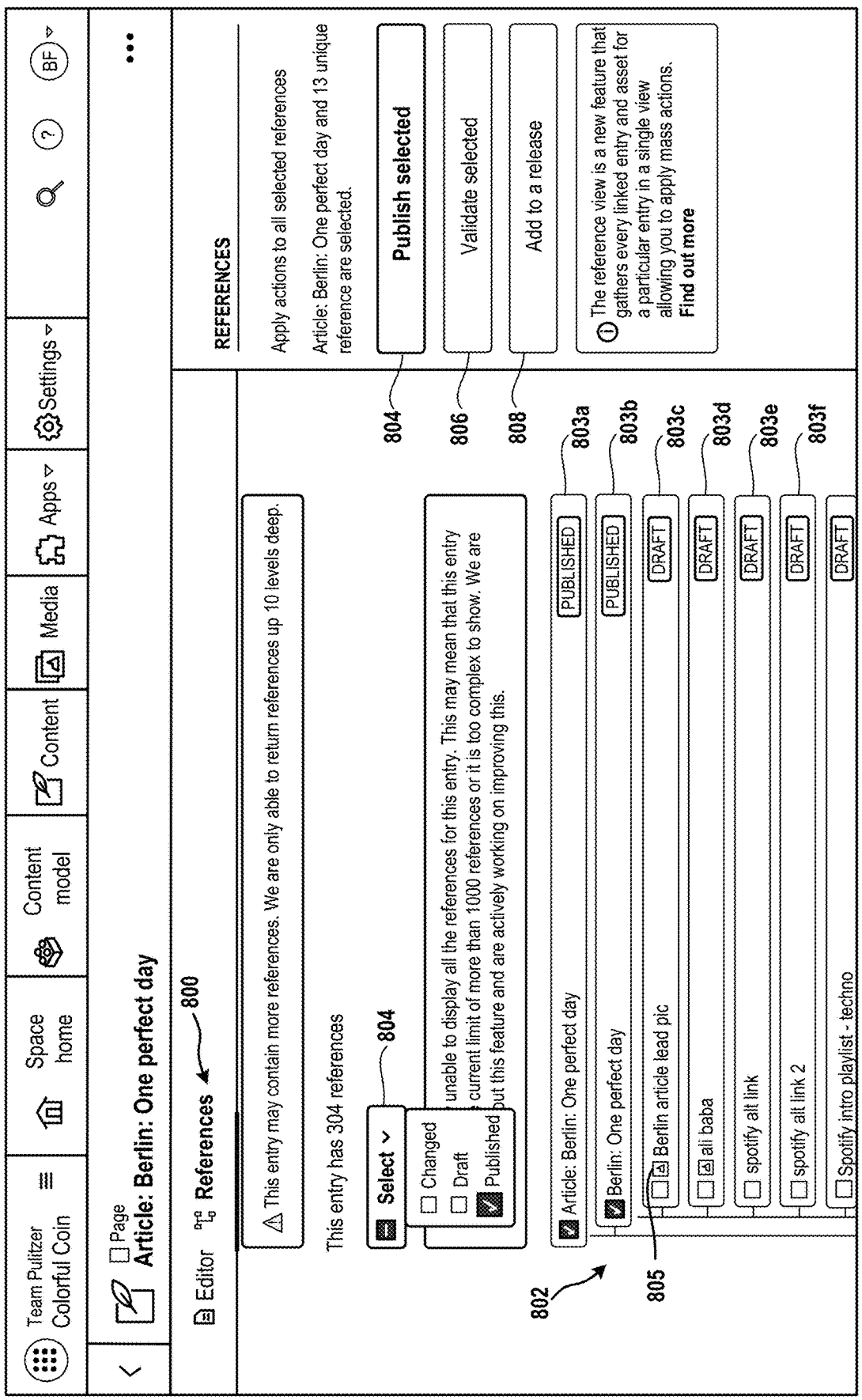

FIG. 8A illustrates a reference tree view for a collection of entries in an environment, in accordance with implementations of the disclosure.

In the illustrated implementation, a user interface of the web editor 112 is shown, and more specifically a references view 800 of a content tab of the web editor UI is shown. In particular, a reference tree 802 is shown, illustrating entities in a hierarchical structure that shows the linked (reference) relationships of the entities to each other. The entities are organized in an outline format with indentation and connecting lines indicating reference relationships. For example, the entry 803a references entry 803b. And the entry 803b references assets 803c and 803d as well as entries 803e and 803f. Assets in the reference tree 802 are indicated by an associated icon 805.

Ones of the entities in the reference tree 802 can be selected, for example, individually via checkboxes. Also, a selector 804 enables selection of those entities in the reference tree that have a status of changed, draft or published. Selected entities can be published via a button 804, validated via a button 806, or added to a release via a button 808.

FIG. 8B illustrates a reference tree showing recursive references, in accordance with implementations of the disclosure.

It will be appreciated that as entities may reference each other, it is possible for a given entity to reference other entities that eventually reference the original entity, such that the given entity may appear in multiple parts of the reference tree 802. Such recursive references can be identified by the system to prevent recursive loading of the entity in the reference tree. Further, such recursive references can be indicated in the reference tree. In the illustrated implementation, an indicator 814 is provided in the reference tree 802, indicating that the associated entity has a recursive reference and appears in multiple locations of the reference tree, in the illustrated example at 810 and 812. This can alert the user to how changes to such entities may have effects beyond the immediately related entities.

Figure 8C:
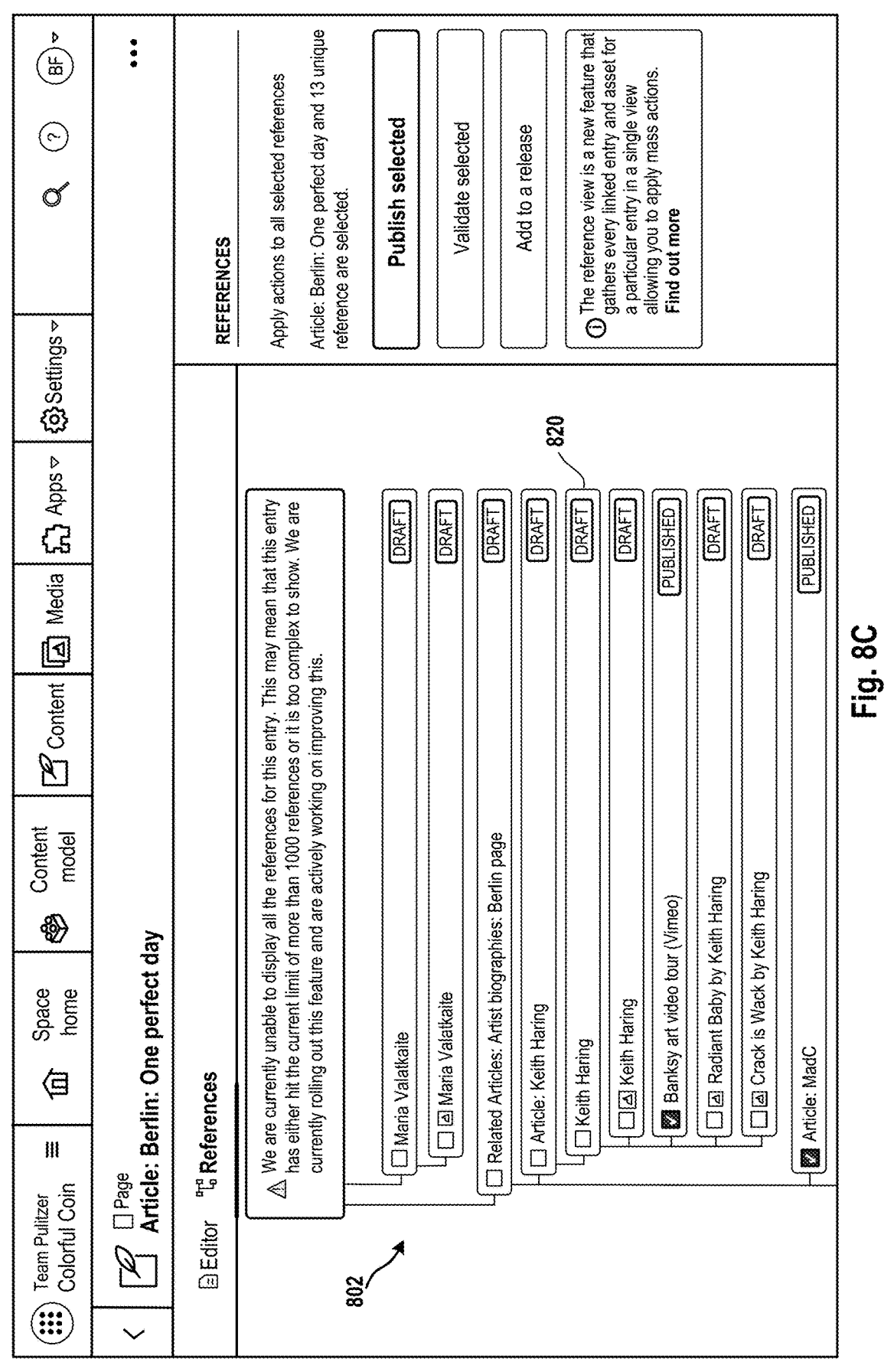

FIG. 8C illustrates a reference tree, in accordance with implementations of the disclosure.

In the illustrated implementation, the reference tree 802 shows an entry 820. Selection of the entry 820 enables viewing of the portion of the reference tree including the entry 820 and its referenced entities.

Figure 8D:
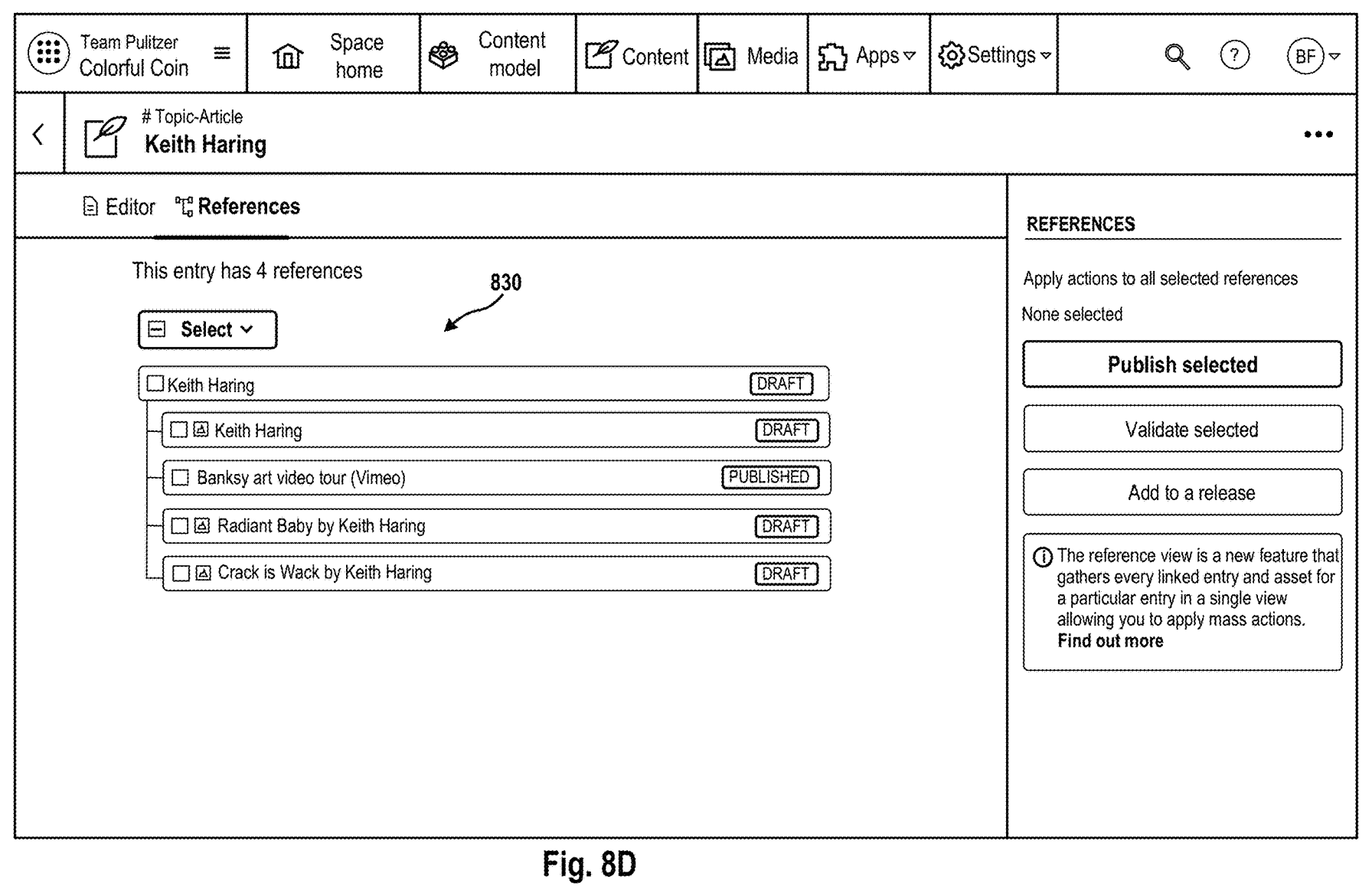

FIG. 8D illustrates the portion of the reference tree for the selected entry 820, in accordance with the implementation of FIG. 8C.

As shown, the portion 830 of the reference tree is focused upon the specific entry and its referenced entities.

FIG. 8E illustrates an editor view for an entry listed in the reference tree, in accordance with implementations of the disclosure.

In the illustrated implementation, the editor view 840 has been selected, and this presents an editing interface for editing fields of the entry 820 which was previously selected as noted above. For example, a Title field 840 and a Short description field 842 are included for editing.

Figure 9A:
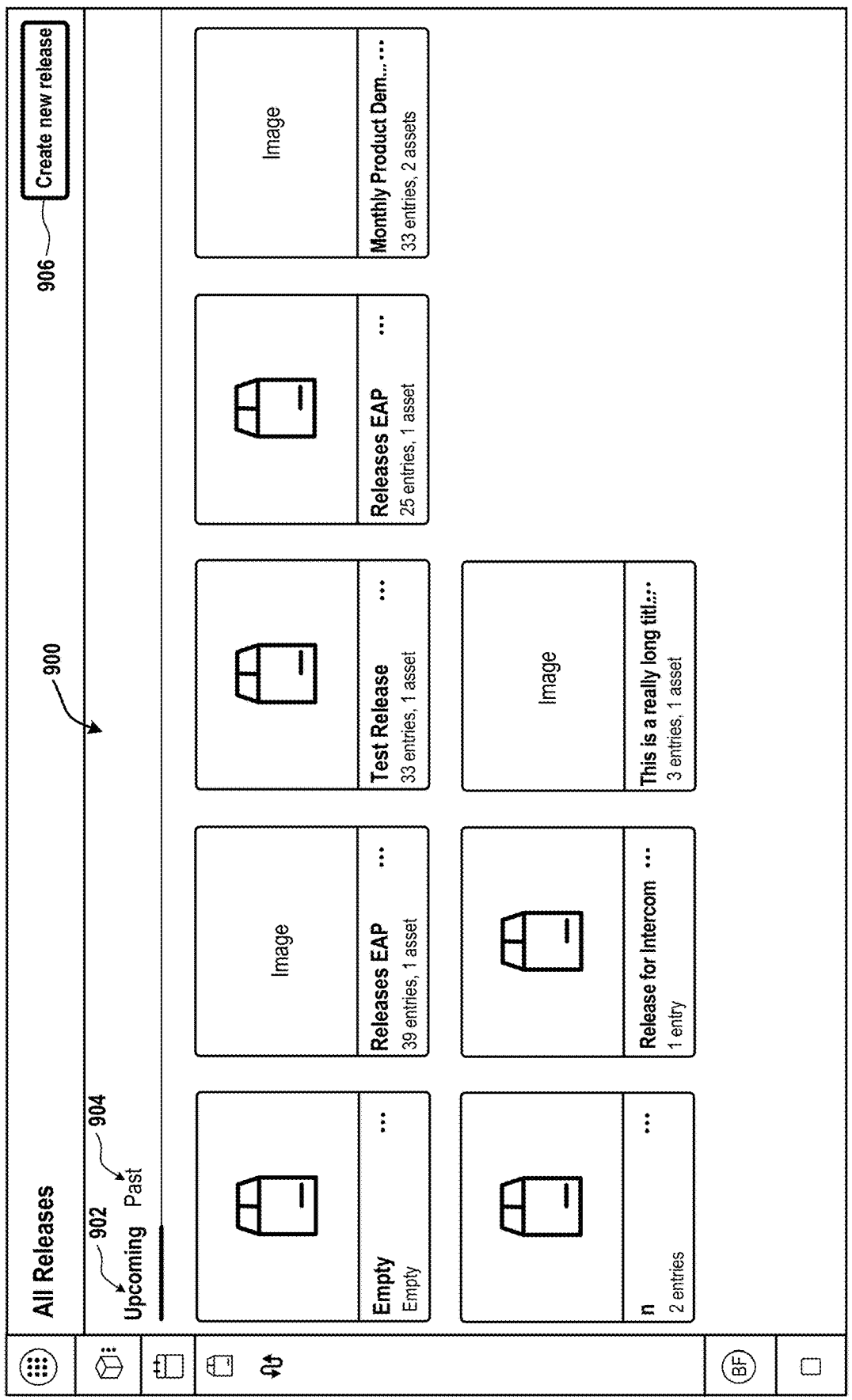

FIG. 9A illustrates an interface for accessing releases, in accordance with implementations of the disclosure.

In some implementations, the illustrated interface is presented via the UI of the scheduling editor 300. In the illustrated view, a section 900 graphically illustrating various releases is shown. The releases are accessible through their graphical icons, which indicate the release's name and number of entries and assets in some implementations. Upcoming releases 902 as well as past releases 904 can be selectively shown. A button 906 is selectable to initiate creation of a new release.

Figure 9B:
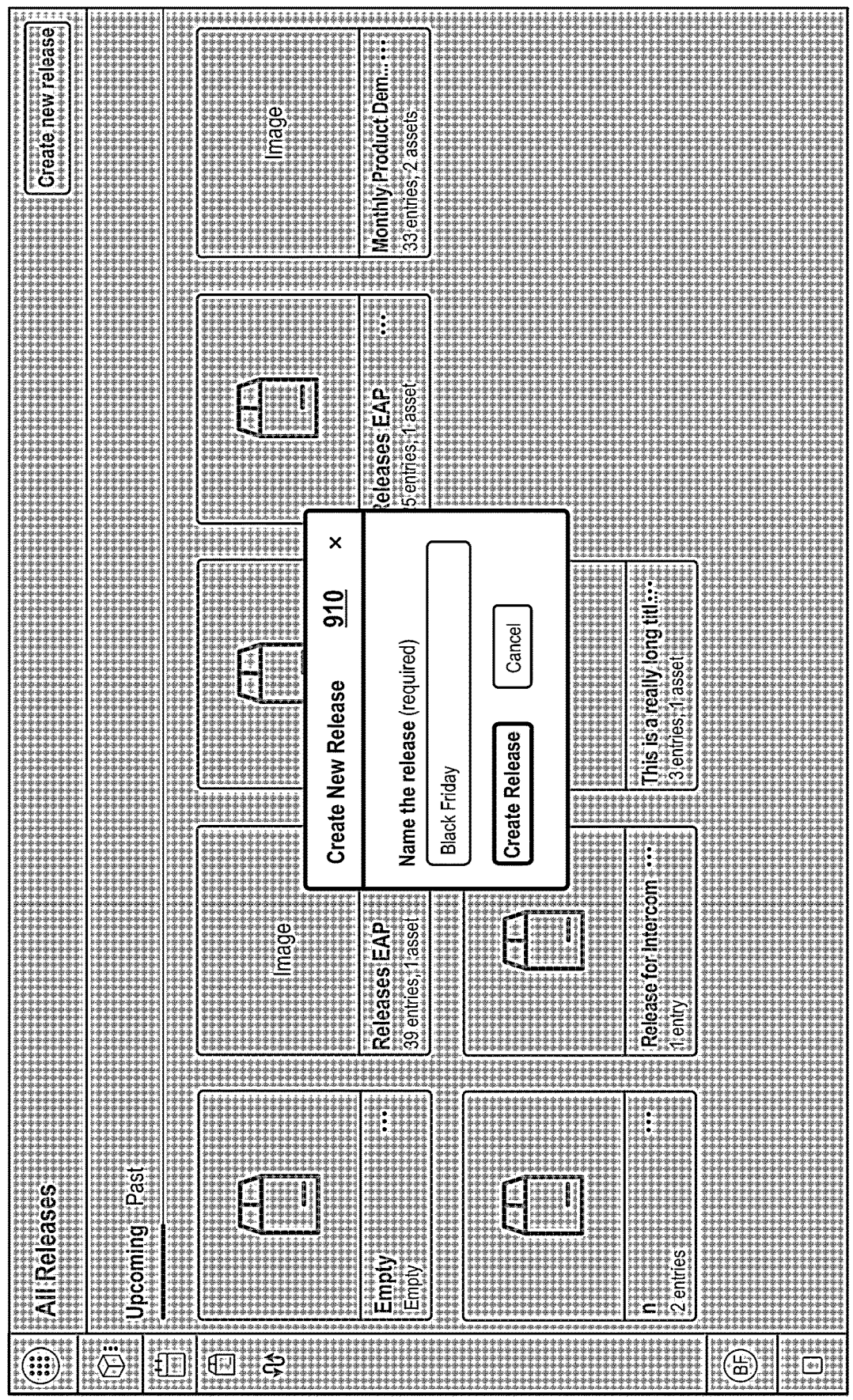

FIG. 9B illustrates a popup interface 910 resulting from selection of the button 906, in accordance with the implementation of FIG. 9A. The interface 910 as shown enables a user to enter a name (e.g. "Black Friday" in the illustrated implementation) and create the new release.

Figure 9C:
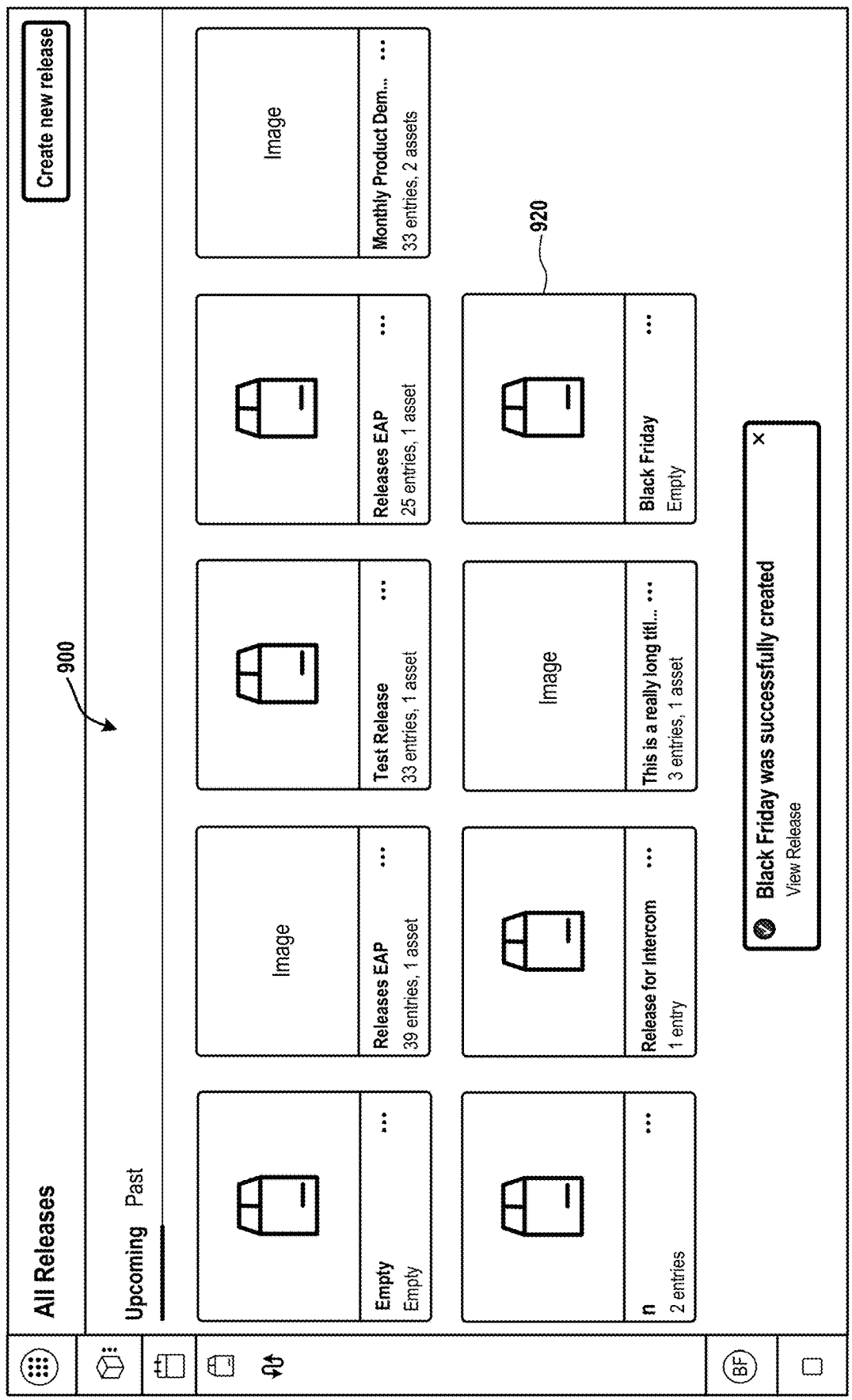

FIG. 9C illustrates the view of releases, in accordance with the implementation of FIG. 9B. The newly created "Black Friday" release is graphically shown by the icon 920 in the section 900 of the interface.

Figure 9D:
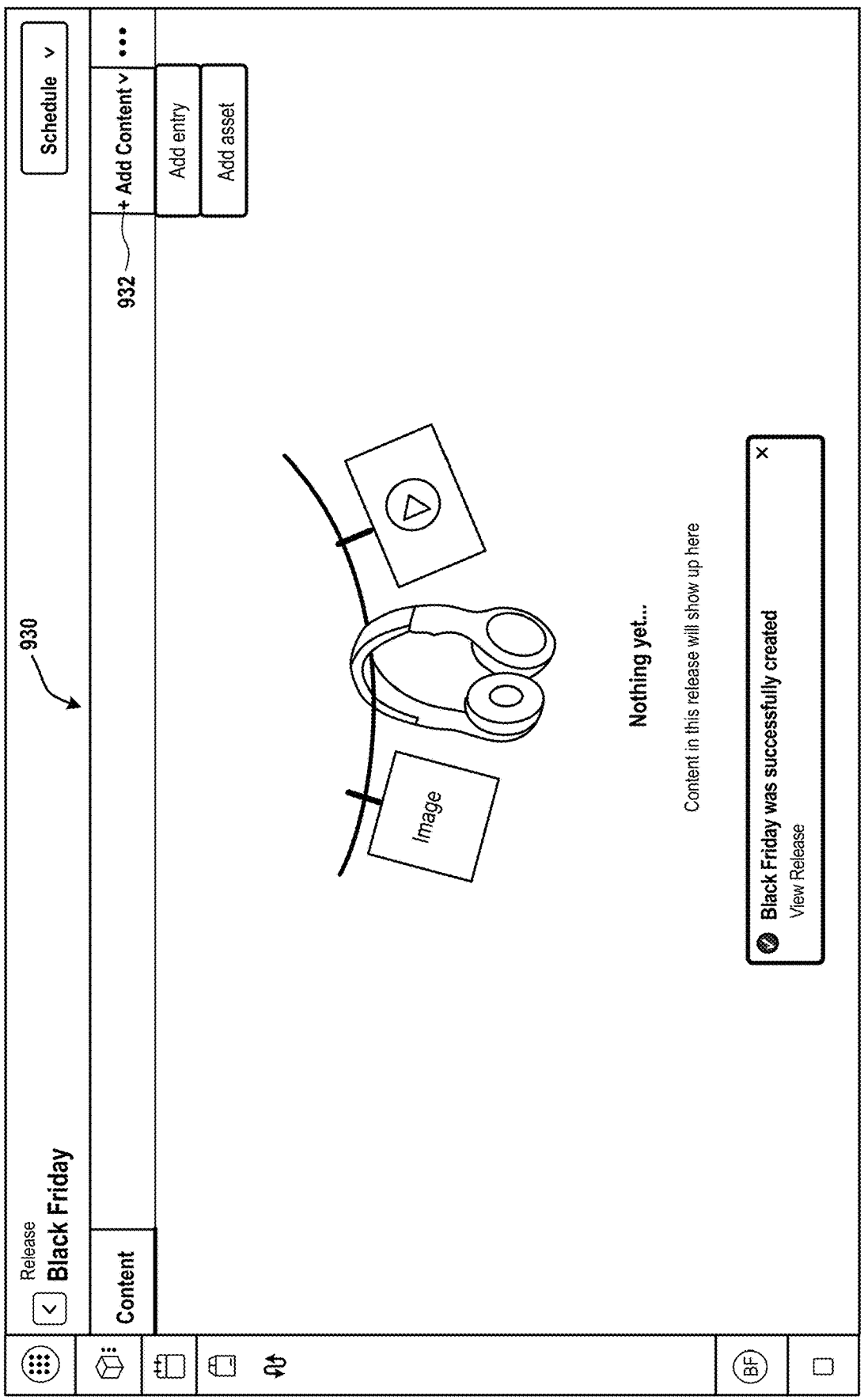

FIG. 9D illustrates a content view of the "Black Friday" release, in accordance with the implementation of FIG. 9C. The illustrated view can be reached via selection of the icon 920 described above. As shown in the section 930, there is currently no content yet in the release. However, an add content button 932 is selectable to enable addition of entries or assets to the release.

Figure 9E:
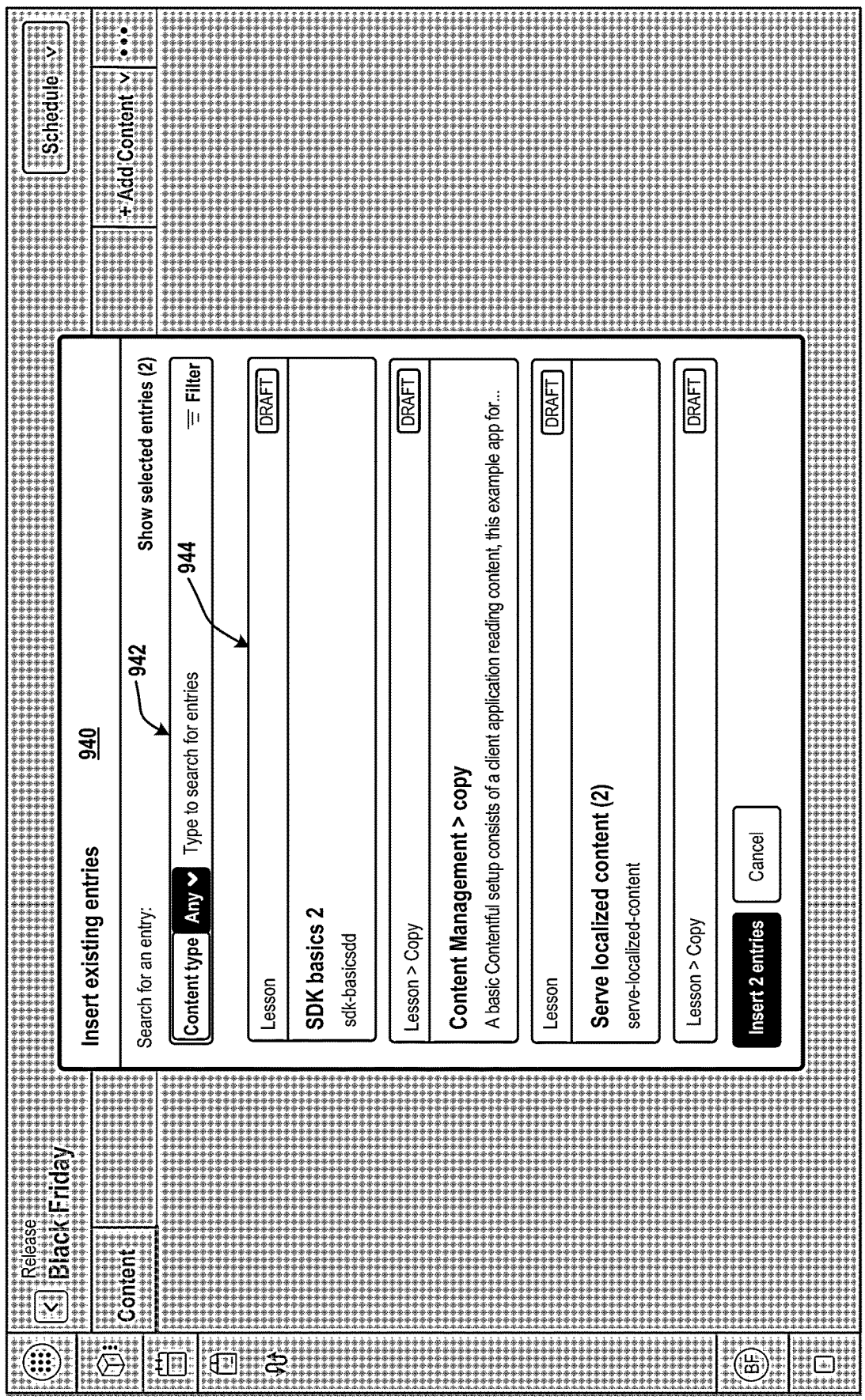

FIG. 9E illustrates a popup interface 940 for adding entries to the "Black Friday" release, in accordance with the implementation of FIG. 9D. The popup interface 940 is surfaced in response to selection of the add content button 932 described above. As shown, the interface 940 includes a search field 942 for enabling a user to search for content entries, and a listing 944 of content entries is shown. The content entries are selectable for insertion in the release.

FIG. 9F illustrates a content view of the "Black Friday" release, in accordance with the implementation of FIG. 9E. As shown in the illustrated content view section 930, the content entries added via the interface of FIG. 9E, are now listed as included in the release.

FIG. 9G illustrates editorial options for a selected entity of a release, in accordance with the implementation of FIG. 9F. In the illustrated implementation, the content view for the "Black Friday" release is shown, including the content entry 950. Selection of the content entry 950 brings up additional editorial options for the content entry 950. For example, an edit button 952 is selectable to access an editing interface, such as that provided by the web editor 112, for editing the content entry 950, including editing fields of the content entry 950.

A preview button 954 is selectable to view a preview of the content entry 950. A remove button 956 is selectable to remove the content entry 950 from the release. A workflow selector 958 is configured to enable selection of a workflow status tag. For example, in the illustrated implementation, various selectable workflow status tags include "In Progress", "In Review", "Approved", and "Update Required".

FIG. 9H illustrates the content view of the "Black Friday" release, in accordance with the implementation of FIG. 9G. Via the workflow selector 958 described above, the "In Progress" workflow status tag has been selected. Accordingly, as shown in the illustrated implementation, the content entry 950 as listed has been updated to include an "In Progress" workflow status indicator 960.

FIG. 9I illustrates the content view of the "Black Friday" release, in accordance with the implementation of FIG. 9H. In the illustrated implementation, the schedule button 970 is selected, revealing options to publish the release, unpublish the release, or validate the release.

Figure 9J:
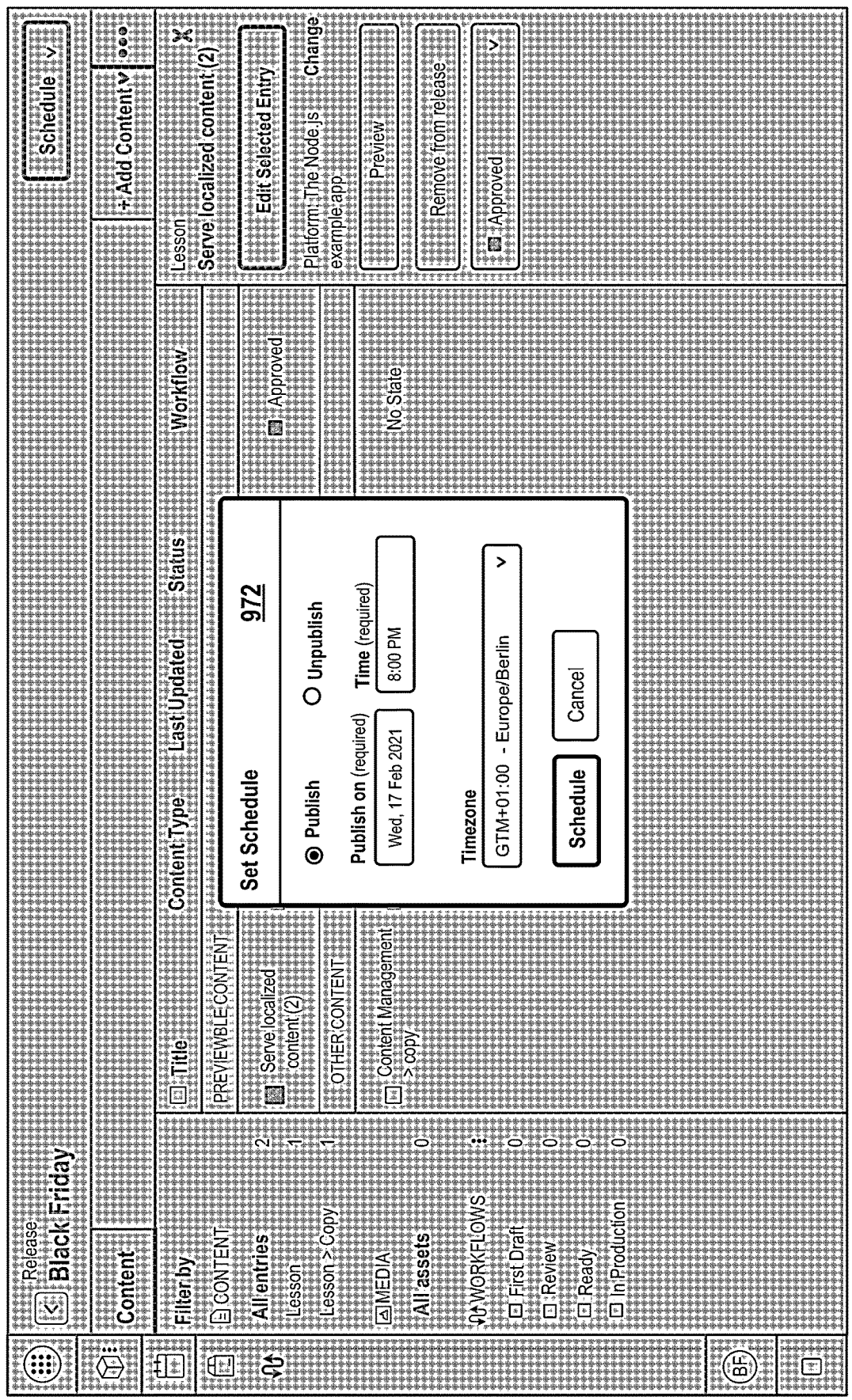

FIG. 9J illustrates a popup interface 972 for scheduling publication of the release, in accordance with the implementation of FIG. 9I. The popup interface 972 is surfaced in response to selection to publish the release via the schedule button 970 described above. As shown, the popup interface 972 enables selection of whether to publish or unpublish the release, setting of a date and time for the action, and setting of a timezone.

FIG. 9K illustrates the content view of the "Black Friday" release, in accordance with the implementation of FIG. 9J. Following the scheduling of the publication via the popup interface 972 described above, then the scheduling of the publishing event for the release is indicated by the scheduling indicator 980, showing that the release is scheduled to be published at the indicated date and time.

FIG. 9L illustrates a calendar view, in accordance with the implementation of FIG. 9K. In the illustrated calendar view the "Black Friday" release listing 992 is shown in the chronological listing of scheduled release actions, indicating it is scheduled to publish at the scheduled date and time. And in the calendar 990, the date of the scheduled publication is highlighted as well.

FIG. 10A illustrates an editor view 1000 for editing a content entry, in accordance with implementations of the disclosure. In the illustrated implementation, the editor view 1000 can be accessed directly via the edit button 952 for the selected content entry 950 as described above. As shown, the fields 1002 of the entry 950 are editable in the illustrated interface. Further, in a sidebar portion of the editor view 1000, a workflow status selector 1004 is also provided to enable setting of the workflow status tag for the entry 950.

Figure 10B:
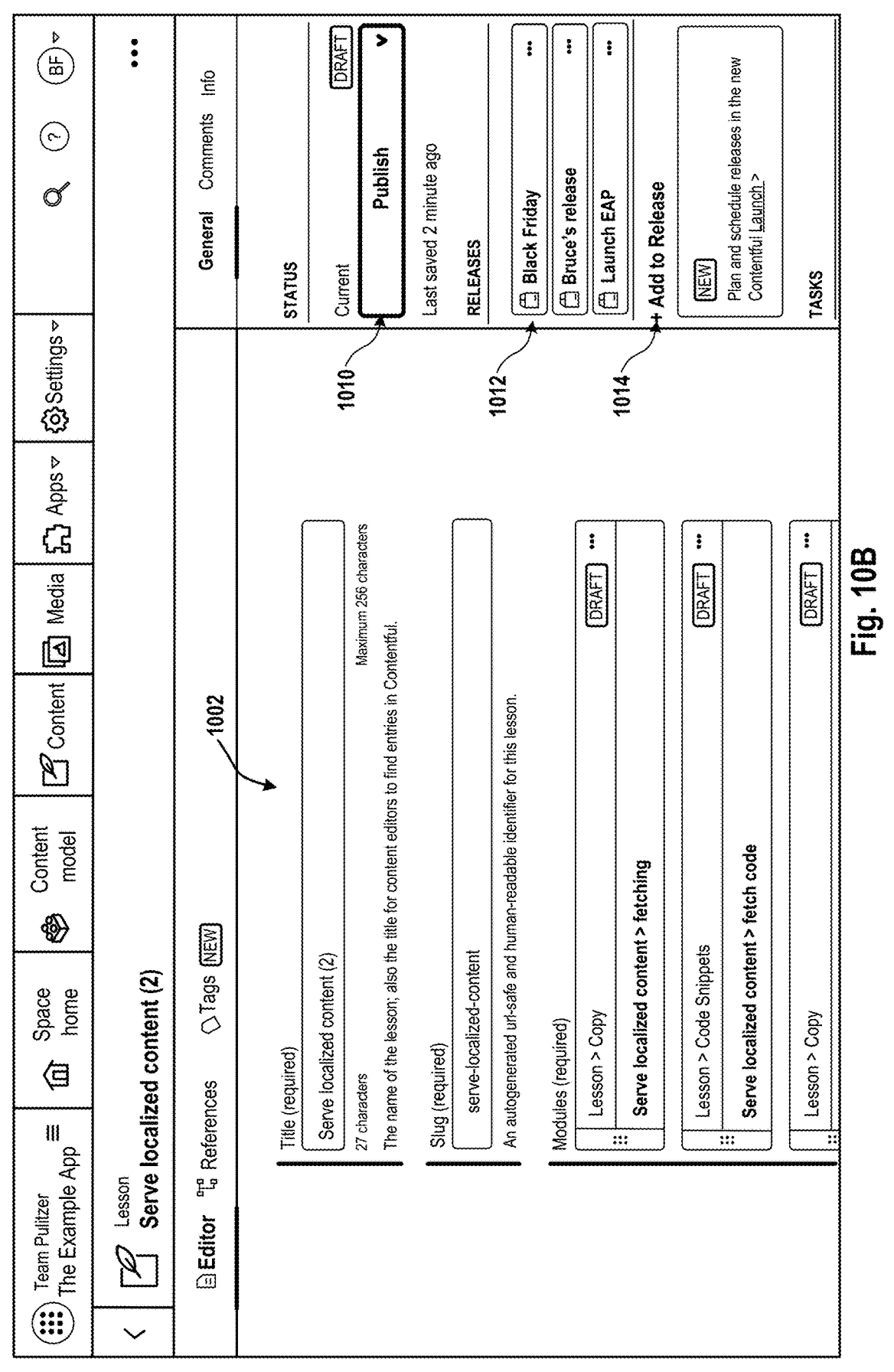

FIG. 10B illustrates the editor view 1000 showing additional functionality in the sidebar portion, in accordance with the implementation of FIG. 10B. In the illustrated implementation, the sidebar portion has been scrolled to reveal additional editorial options, including a publish button 1010 that enables publishing/validation and/or scheduling of the content entry. A listing 1012 of releases indicates releases to which the entry has been added. Further, an add to release button 1014 is provided to enable adding of the content entry to additional releases.

Figure 10C:
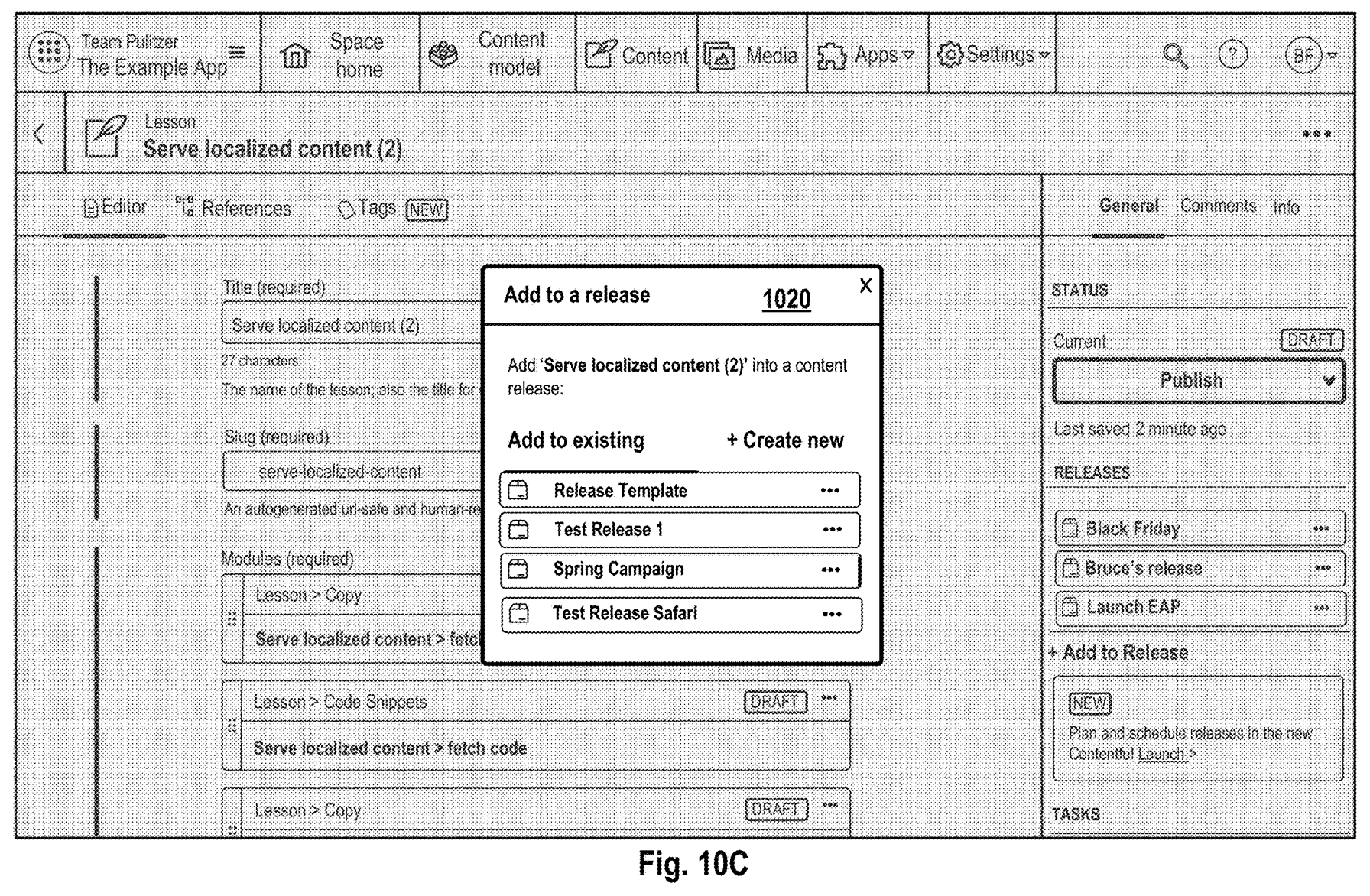

FIG. 10C illustrates a popup interface 1020 for adding an entry to a release, in accordance with the implementation of FIG. 10B. As shown, the popup interface 1020 provides options to add the entry to an existing release, or create a new release to which the entry will be added.

Figure 11A:
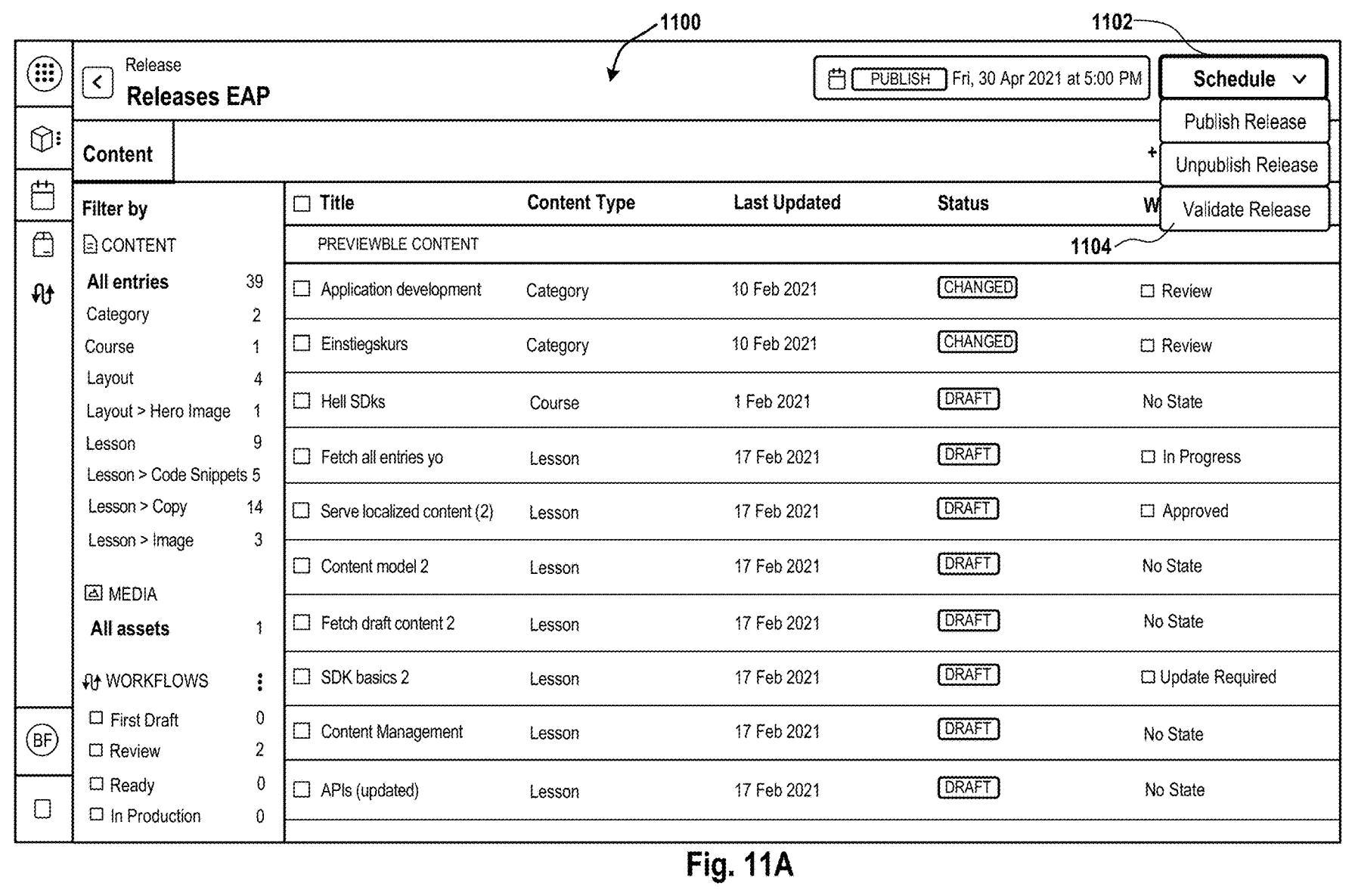

FIG. 11A illustrates a content view of a release, in accordance with implementations of the disclosure. In the illustrated implementation, a listing 1100 of entities in the release is shown. Additionally, a schedule selector 1102 is shown having been clicked to reveal various options, including options to publish, unpublish, or validate 1104 the release. Selection of the validate option 1104 initiates validation of the release without publishing the release. This enables a user to validate the content of the release prior to scheduling it for publication, so that the user may be confident that the release will publish successfully at a scheduled time.

FIG. 11B illustrates the content view of the release, in accordance with the implementation of FIG. 11A. Following performance of the validation of the release in accordance with the above, in the illustrated implementation, the interface reflects that the validation has failed. Accordingly, an indicator 1110 indicates that one entity in the release did not pass validation. Further, editing options 1112 are surfaced specific to the entity that did not pass validation, including an edit button 1114 that is selectable to open the editor view for editing the entry, or a remove button 1116 that is selectable to remove the entry from the release.

Figure 11C:
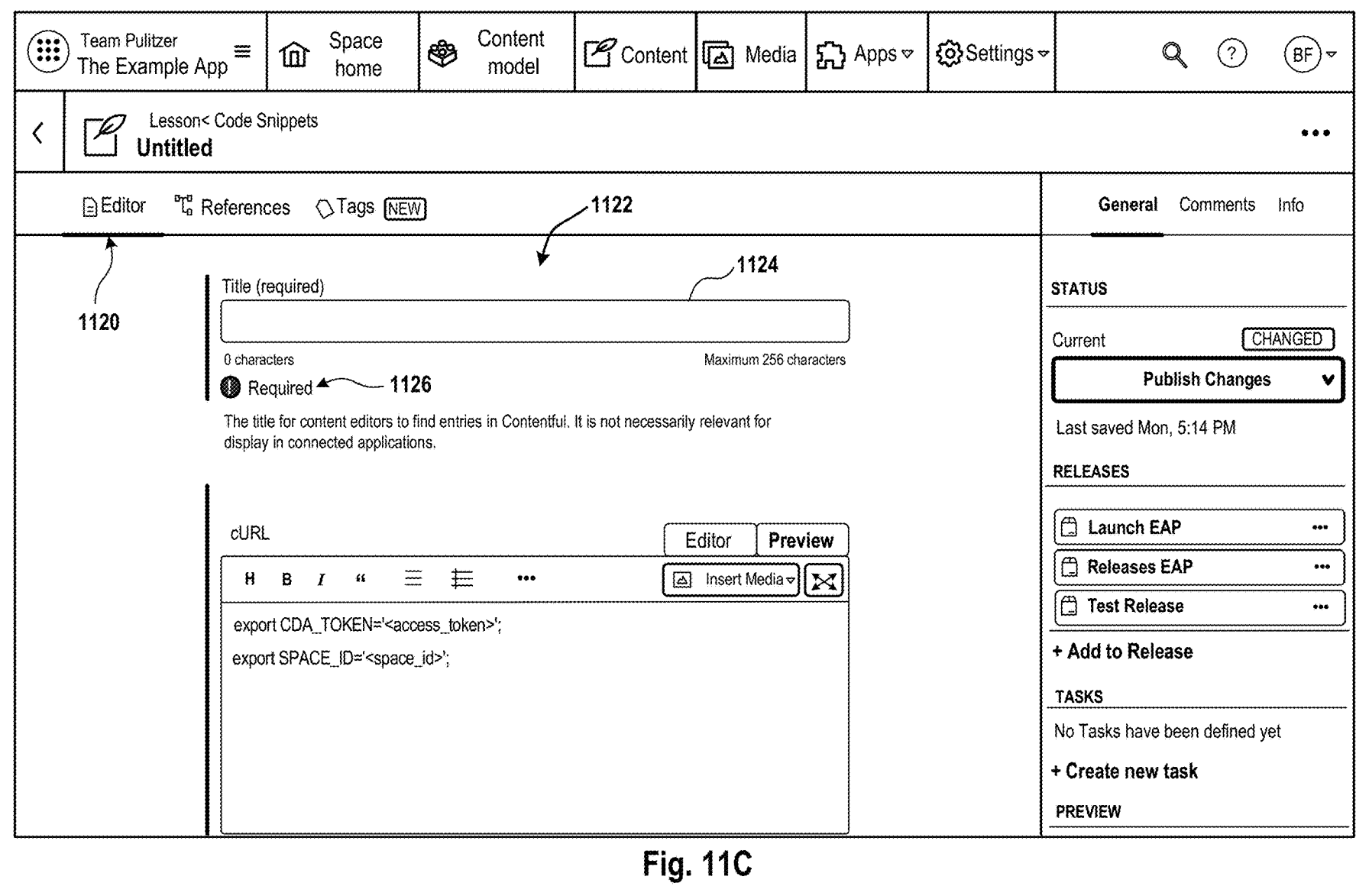

FIG. 11C illustrates an editor view, in accordance with the implementation of FIG. 11C. In the illustrated implementation, the edit button 1114 as described above has been selected and the editor view 1120 for the entry that did not pass validation has been opened. The illustrated interface enables editing of the fields 1122 of the entry, with the "Title" field 1124 that failed validation being highlighted, and further with an indicator 1126 indicating that the field 1124 is a required field (this requirement constituting a validation constraint).

Figure 12:
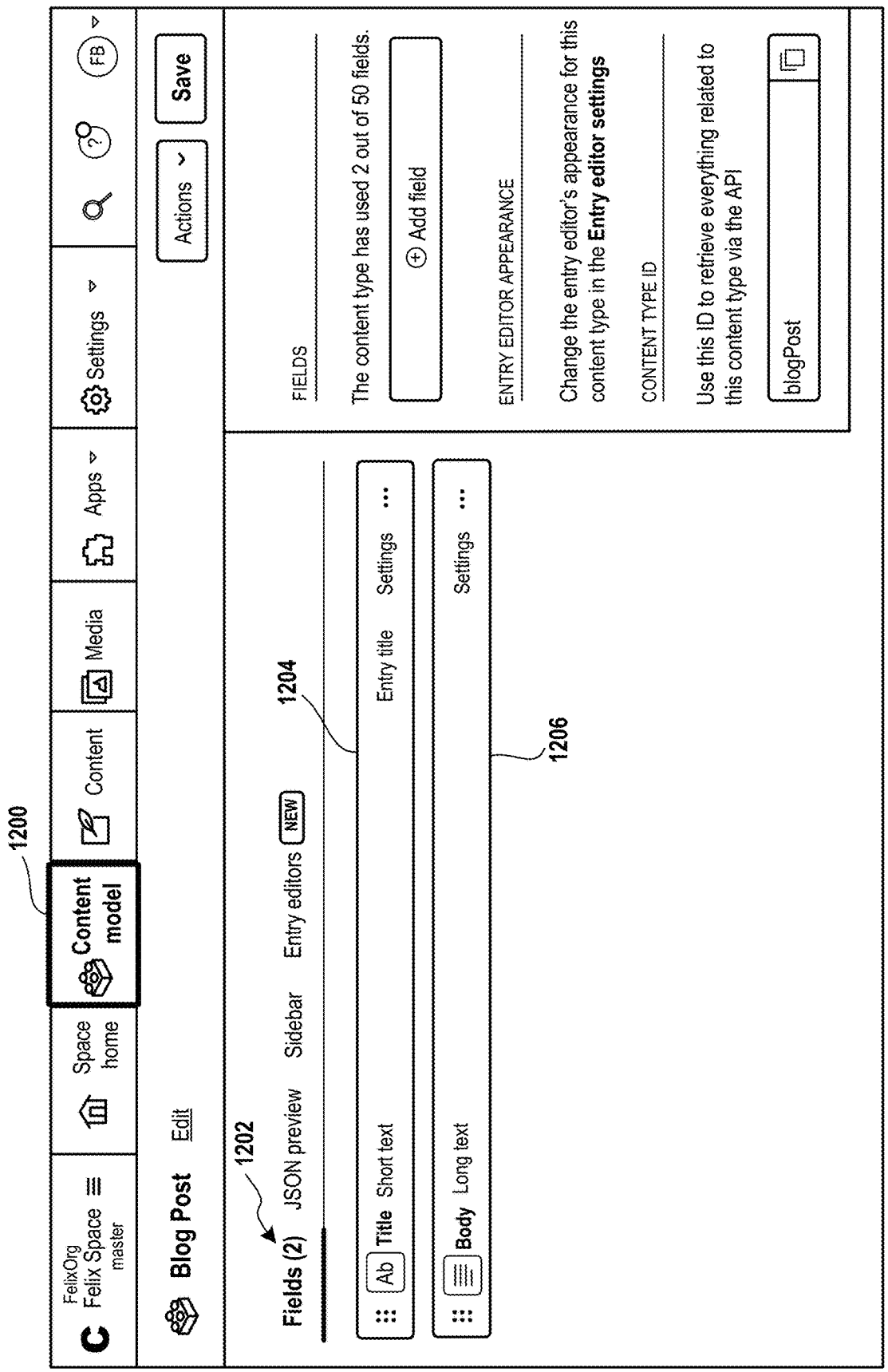
FIG. 12 illustrates an interface view of a Content model tab 1100 of a CMS editorial application, in accordance with implementations of the disclosure.

FIG. 12 illustrates an interface view of a Content model tab 1200 of a CMS editorial application, in accordance with implementations of the disclosure.

In the illustrated implementation, a view of a "Blog Post" type is shown, with the Fields 1202 of the type being currently displayed. As shown, the "Blog Post" type includes a Title field 1204 and a Body field 1206.

Figure 13:
FIG. 13 illustrates an interface view of a Content tab of a CMS editorial application, in accordance with implementations of the disclosure.

FIG. 13 illustrates an interface view of a Content tab 1300 of a CMS editorial application, in accordance with implementations of the disclosure.

In the illustrated implementation, a listing of content entries 1302 for a given space environment is shown, including the name, the date the entry was last updated, the author, and the status (e.g. published, unpublished, etc.). The listing of content entries can be filtered by content type, or searched. A listing of content types 1304 is also shown.

Figure 14:
FIG. 14 illustrates an interface view of an entry editor of a CMS editorial application for adding a new entry to a content project/environment, in accordance with implementations of the disclosure.

FIG. 14 illustrates an interface view of an entry editor of a CMS editorial application for adding a new entry to a content project/environment, in accordance with implementations of the disclosure.

In the illustrated implementation, the entry being edited is of a "Help Center—Article" type, and accordingly has certain predefined fields which are fillable/editable to compose the entry. As shown, these fields include a Title field 1400, Slug field 1402, Preview Description field 1404, and Content field 1406, which are editable via the illustrated text entry boxes.

FIG. 15 illustrates an interface view of a Media tab 1500 of a CMS editorial application, in accordance with implementations of the disclosure.

In the illustrated implementation, a listing of assets 1502 is shown, including various information displays such as a preview thumbnail, name, dimensions, type, when the asset was last updated, by whom, and status. Various file types are supported, including attachment, plain text, image, audio, video, and rich text.

Figure 16:
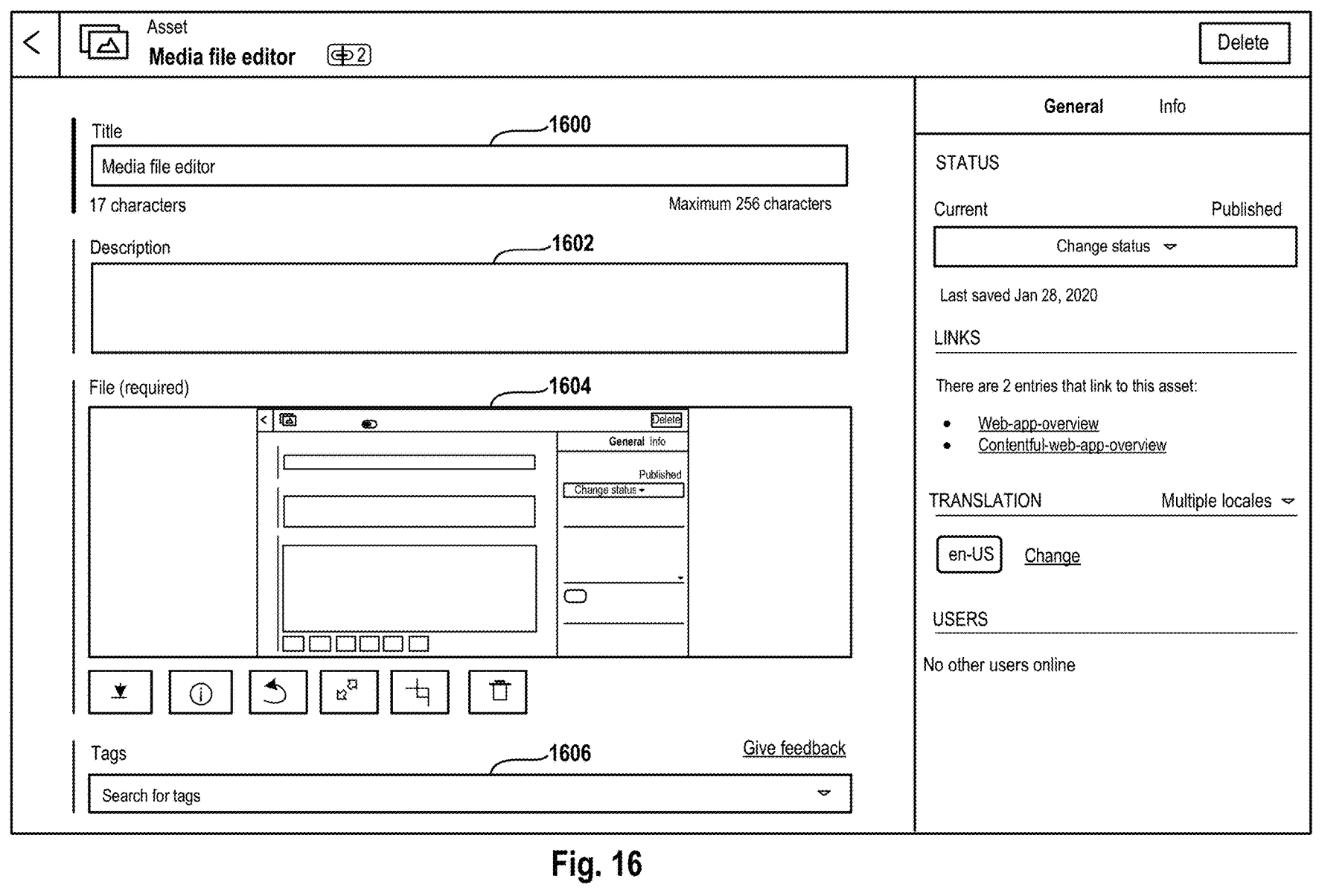

FIG. 16 illustrates an interface view of an Asset editor of a CMS editorial application for editing an Asset, in accordance with implementations of the disclosure. In the illustrated implementation, various definitional fields for the asset as shown, including a Title 1600, Description 1602, File 1604, and Tags 1606.

Traditional content management systems, e.g., like Wordpress™ and Sitecore™ were designed to store and present content elements like text, images and video on websites. That is, the traditional CMS approach is to manage content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 17:
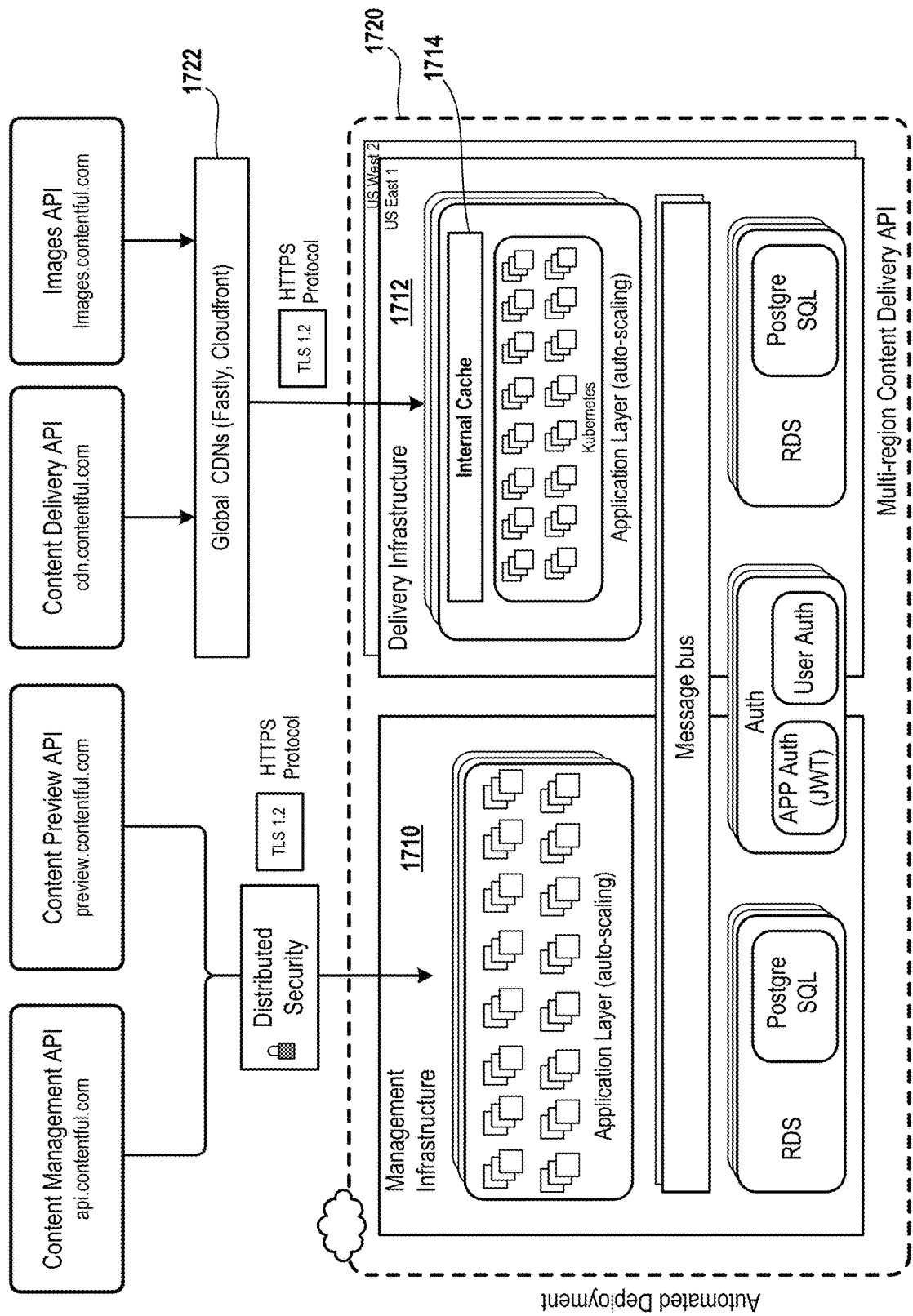
FIG. 17 illustrates an example of how a content management API (CMA) and a content preview API (CPA) can make calls to a content management system (CMS), in accordance with implementations of the disclosure.

FIG. 17 illustrates an example of how the content management API (CMA) and the content preview API (CPA) can make calls to the content management system (CMS) 1720. In one configuration, the CMS 1720 includes compute and storage resources for management of structured content. As described above, a web editor provides for a user interface (UI) that remote client device uses to access the CMS 1720. Based on the type of content creation and/or editing being performed via the UI of the web editor, either the CMA or CPA are used to make API calls to the management 1710 compute and storage resources. The compute and storage resources which run the CMS 1720, in one embodiment, are run in a cloud based environment. The cloud based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1720. Broadly speaking, the CMS 1720 is executed using cloud infrastructure, which includes the use of multiple interconnected data centers throughout the world.

In one configuration, the CMS 1720 also includes a delivery component 1712, which is configured to service processing operations from the content delivery API and the images API. As shown, in one embodiment, the delivery component 1712 is provisioned with internal cache 1714, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1712 is part of the CMS 1720, and is also executed on compute and storage of a cloud infrastructure. In one embodiment, structured content is prepared and/or edited using the management component 1710, before it is published for external consumption. By separating structured content in the cloud infrastructure, it is possible to prevent non-ready content from being accessed and delivered using the CDA.

Agents accessing the CMS 1720, including organizations, individual users, as well as applications or apps, are authenticated by an authentication and authorization system. In some implementations, user authentication uses an authentication API of the CMS, which in some implementations, uses MySQL as a store. In some implementations, app authentication uses JSON Web Tokens.

Data can be stored, accessed, and edited using a relational database (management) service (RDBMS or RDS) implementing one or more database (DB) instances, such as a PostgreSQL instance in some implementations. In some implementations, the same PostgreSQL database instance is accessible from both the Management and primary Delivery infrastructures. In some implementations, multi-region delivery is enabled using a cross-region replication, for example, sourced from the same DB such as a content database instance in accordance with implementations of the disclosure.

It should be apparent, that the present embodiments may be practiced without some or all of these specific details. Modification to the modules, code and communication interfaces are also possible, so long as the defined functionality for the content management system (CMS) or modules of the CMS is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A process for rendering a user interface for launching content for publication using a content management system (CMS), comprising:
    providing, over a network, an editor application associated with the CMS, the editor application enabling editing of entities stored in the CMS;
    providing, over the network, a launch application, wherein execution of the launch application renders the user interface for launching content for publication, wherein the user interface includes a reference tree providing a hierarchical visualization of reference relationships amongst the entities;
    receiving selection of a group of entities, via the reference tree of the user interface, the selection is for publishing the group of entities; and
    generating, responsive to the selection, an application programming interface (API) call to the CMS, the API call is defined to trigger initiation of a validation process to validate each entity in the group of entities, without requiring separate API calls for validating each entity in the group of entities; and,
    wherein the validation process, once initiated, proceeds automatically without requiring said separate API calls to separately initiate publication of each of the entities in the group of entities.

2. The process for rendering a user interface of claim 1, wherein the reference relationships are defined by link type fields of one or more of the entities that are configured to identify one or more other entities.

3. The process for rendering a user interface of claim 1, wherein the hierarchical visualization is defined by an outline format with connecting lines indicating said reference relationships.

4. The process for rendering a user interface of claim 1, wherein the reference tree includes checkboxes that enable said selection of the group of entities for publishing.

5. The process for rendering a user interface of claim 1, wherein rendering the user interface includes identifying recursive references and preventing recursive loading in the reference tree.

6. The process for rendering a user interface of claim 5, wherein the reference tree is configured to include a recursive indicator that indicates an entity having a recursive reference.

7. The process for rendering a user interface of claim 1, wherein responsive to the API call to the CMS, each entity in the group of entities is fetched to a draft entity store to enable said validation, wherein a loop of said validation process is used to validate each entity in the group of entities.

8. The process for rendering a user interface of claim 1, wherein the CMS provides the user interface for said selection of the group of entities for publishing, and said selection is received from a user device having access to the CMS.

9. The process for rendering a user interface of claim 1, wherein after each entity in the group of entities is validated during the validation process, a validation indicator is associated with the respective entity in the group of entities.

10. The process for rendering a user interface of claim 1, wherein following completion of the validation process, a validation indicator that identifies a failure of an entity to pass validation causes a non-publication of the group of entities in entirety.

11. The process for rendering a user interface of claim 10, wherein the validation indicator that identifies the failure further triggers identification of the entity that failed to pass validation in the user interface, and an option to access an editing interface of the editor application to edit one or more fields of the entity that failed to enable passing of said validation.

12. The process for rendering a user interface of claim 1, wherein following completion of the validation process, then successful validation of the group of entities triggers setting each entity in the group of entities to a published status.

13. The process for rendering a user interface of claim 12, wherein the setting of each entity in the group of entities to the published status enables retrieval of each entity from the CMS through a content delivery API of the CMS.

14. The process for rendering a user interface of claim 12, wherein the successful validation of the group of entities further triggers notifications to caching systems of the CMS.

15. The process for rendering a user interface of claim 1, wherein an asynchronous process triggers the initiation of the validation process, the asynchronous process configured to limit a rate of access to entities of the CMS.

16. The process for rendering a user interface of claim 1, wherein the user interface enables scheduling of the group of entities for publication at a predefined date and time, and wherein generating the API call is further responsive to reaching the predefined date and time.

17. The process for rendering a user interface of claim 16, wherein the user interface further enables a calendar view of groups of entities that are scheduled for publication.

18. The process for rendering a user interface of claim 17, wherein the calendar view is configured to provide a calendar configured to indicate days having publication events scheduled thereon.

19. A non-transitory computer-readable medium having program instructions embodied thereon that, when executed by at least one server computer, cause said at least one server computer to perform a process for rendering a user interface for launching content for publication using a content management system (CMS), said process including the following operations:

providing, over a network, an editor application associated with the CMS, the editor application enabling editing of entities stored in the CMS;

providing, over the network, a launch application, wherein execution of the launch application renders the user interface for launching content for publication, wherein the user interface includes a reference tree providing a hierarchical visualization of reference relationships amongst the entities;

receiving selection of a group of entities, via the reference tree of the user interface, the selection is for publishing the group of entities; and generating, responsive to the selection, an application programming interface (API) call to the CMS, the API call is defined to trigger initiation of a validation process to validate each entity in the group of entities, without requiring separate API calls for validating each entity in the group of entities; and, wherein the validation process, once initiated, proceeds automatically without requiring said separate API calls to separately initiate publication of each of the entities in the group of entities.

20. A content management system (CMS) comprising at least one server computer, said at least one server computer being configured to perform a process for rendering a user interface for launching content for publication using a content management system (CMS), said process including the following operations:

providing, over a network, an editor application associated with the CMS, the editor application enabling editing of entities stored in the CMS;

providing, over the network, a launch application, wherein execution of the launch application renders the user interface for launching content for publication, wherein the user interface includes a reference tree providing a hierarchical visualization of reference relationships amongst the entities;

receiving selection of a group of entities, via the reference tree of the user interface, the selection is for publishing the group of entities; and generating, responsive to the selection, an application programming interface (API) call to the CMS, the API call is defined to trigger initiation of a validation process to validate each entity in the group of entities, without requiring separate API calls for validating each entity in the group of entities; and, wherein the validation process, once initiated, proceeds automatically without requiring said separate API calls to separately initiate publication of each of the entities in the group of entities.

* * * * *